(12) United States Patent
Takeuchi

(10) Patent No.: US 6,990,942 B2
(45) Date of Patent: Jan. 31, 2006

(54) BALANCER STRUCTURE FOR ENGINE

(75) Inventor: Yoshihiko Takeuchi, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/860,249

(22) Filed: Jun. 3, 2004

(65) Prior Publication Data

US 2004/0244757 A1    Dec. 9, 2004

(30) Foreign Application Priority Data

Jun. 3, 2003  (JP)  .............................. 2003/158474
Apr. 1, 2004  (JP)  .............................. 2004/109255

(51) Int. Cl.
*F02B 75/06*  (2006.01)

(52) U.S. Cl. .................................. 123/192.2
(58) Field of Classification Search .............. 123/192.2
See application file for complete search history.

(56) References Cited

U.S. PATENT DOCUMENTS 5,038,731 A * 8/1991 Shimada .................. 123/192.2
5,218,885 A * 6/1993 Nakano et al. ........... 123/192.2

FOREIGN PATENT DOCUMENTS

JP  09-250597  9/1997
JP  2002-089625  3/2002

* cited by examiner

*Primary Examiner*—Noah P. Kamen
(74) *Attorney, Agent, or Firm*—Hogan & Hartson, L.L.P.

(57) ABSTRACT

A balancer structure for an engine includes a first balancer shaft, a second balancer shaft, a crankshaft having a crank gear and balancer gears on the first and second balancer shafts provided parallel to the crankshaft and driven for rotation by the crank gear. The first balancer shaft is provided on one side of a normal plane including an axis of the crankshaft, and the second balancer shaft is provided on another side. On the second balancer shaft is provided a counter gear for transmitting a rotation of the crankshaft to a main shaft of a transmission mechanism.

20 Claims, 24 Drawing Sheets

BALANCER STRUCTURE FOR ENGINE

BACKGROUND OF THE INVENTION

1. Field of the Invention

This invention relates to a balancer structure for an engine in which two balancer shafts are provided for one crankshaft.

2. Description of Related Art

Of engines with a large displacement, single-cylinder or V-type two-cylinder engines, for example, are in use in a lower engine speed range compared with multi-cylinder engines such as four-cylinder engines. Therefore, a vibration due to an inertia force becomes dominant. In some engines of this type, for the purpose of canceling the inertia force, a phase-pin crank has been adopted, which has a phase difference in the position of the crank pins or a two-shaft primary balancer has been adopted, which has two balancer shafts. By the way, in a one-shaft primary balancer with one shaft, the moment of the inertia force cannot be canceled and a vibration reducing effect is small especially in engines with a large displacement.

However, when the foregoing phase-pin crank is adopted, since pins with different phases are connected, a web is required between pins and the distance between crank journals as supporting points is necessarily increased compared with a coaxial pin crank, which is disadvantageous to the strength or the rigidity of the crankshaft. In engines with a displacement, for example, over 1000 cc in particular, a large web thickness and thus a large minimum sectional area are required to secure the strength sufficient enough to withstand increased torque variations, so that a longer crankshaft is needed and the width of the crankcase is enlarged that much.

In contrast, when the foregoing two-shaft primary balancer is adopted, although an increase in width of the crankcase can be prevented, the two balancer shafts should be disposed in front of and behind the crankshaft, so that the length of the crankcase is increased.

In view of the foregoing, an advantage of the invention is to provide a balancer structure for an engine capable of suppressing an increase in the longitudinal length of a crankcase when a two-shaft primary balancer is adopted.

SUMMARY OF THE INVENTION

An embodiment of the present invention is directed to a balancer structure for an engine in which balancer gears on a first and a second balancer shaft provided parallel to a crankshaft are driven for rotation by a crank gear of the crankshaft. The first balancer shaft is provided on one side of a normal plane including the axis of the crankshaft, and the second balancer shaft is provided on the other side. On the second balancer shaft is provided a counter gear for transmitting the rotation of the crankshaft to a main shaft of a transmission mechanism.

A torque damper for preventing a large torque from the crankshaft from being transmitted directly to the main shaft is provided in a drive force transmission path for transmitting a drive force of the crankshaft to the main shaft, on the downstream side from the balancer gear on the second balancer shaft.

The main shaft is provided on the opposite side from the crankshaft, with the balancer shaft placed therebetween. A shift drum is provided between the main shaft and the second balancer shaft.

The first balancer shaft is disposed on one side of a horizontal plane including the axis of the crankshaft, and the second balancer shaft is provided on the other side.

The engine has front and rear cylinders disposed forming a V-bank and is a V-type, two-cylinder engine mounted on a vehicle body, with the crankshaft oriented in the lateral direction. The first balancer shaft is disposed in front of the normal plane including the axis of the crankshaft and above the horizontal plane including the axis. The second balancer shaft is disposed behind the normal plane and below the horizontal plane. A drive shaft of the transmission mechanism is disposed rearward of the second balancer shaft and near the horizontal plane. The main shaft is disposed above the horizontal plane and between the drive shaft and the second balancer shaft. A shift drum is disposed such that its axis is located in a region surrounded by axes of the main shaft, the drive shaft and the second balancer shaft.

According to an embodiment of the present invention, the second balancer shaft is provided with a counter gear for transmitting a rotation of the crankshaft to the main shaft, so that the second balancer shaft is used as a counter shaft as well. Therefore, the counter shaft is dispensed and the length of the crankcase in the direction perpendicular to the crankshaft can be decreased by the amount corresponding to the layout space of the counter shaft.

A torque damper is provided on the second balancer shaft. Therefore, direct transmission of the torque variations in the crankshaft can be prevented, preventing damage to transmission gears.

In this case, the torque damper is disposed in the drive force transmission path for transmitting the rotational force of the crankshaft to the main shaft, on the downstream side from a balancer gear on the balancer shaft. Therefore, a phase shift of a balancer weight can be prevented when the torque damper is activated.

The main shaft is disposed on the opposite side from the crankshaft, with the second balancer shaft therebetween. Therefore, a relatively large space is produced around the meshing portion of the counter gear on the balancer shaft with a large reduction gear on the main shaft and a shift drum can be disposed by utilizing this space. As a result, the drive shaft can be disposed closer to the crankshaft and an increase in the longitudinal length of the crankcase can be suppressed when two balancer shafts are provided.

The first balancer shaft is provided on one side of a horizontal plane including the axis of the crankshaft, and the second balancer shaft on the other side. Therefore, the shaft distance in the horizontal direction between the first and second balancer shafts can be decreased compared with when both balancer shafts are disposed on the horizontal plane, so that an increase in the longitudinal length of the crankcase can be suppressed in this respect as well.

When a first and a second balancer shaft are disposed in a front and rear V-type, two-cylinder engine with a laterally displaced crankshaft, the first balancer shaft is disposed in front of and above the crankshaft, and the second balancer shaft is disposed behind and below the crankshaft. Therefore, a relatively large space can be secured rearward of and above the second balancer shaft, and the main shaft which has a large reduction gear and requires a relatively large space can be disposed in this space while preventing an increased longitudinal length of the crankcase.

The region surrounded by the main shaft, the drive shaft and the second balancer shaft forms a relatively large space because of gears on the second balancer shaft. The large reduction gear on the main shaft is in a meshing relation, so that the shift drum can be disposed without interference by utilizing this space.

BRIEF DESCRIPTION OF DRAWINGS

FIG. 23 is a view showing an arrangement of a radiator according to another embodiment of the present invention; and.

DETAILED DESCRIPTION OF THE PREFERRED EMBODIMENTS

Now, embodiments of this invention will be described below with reference to the accompanying drawings.

Figure 1:
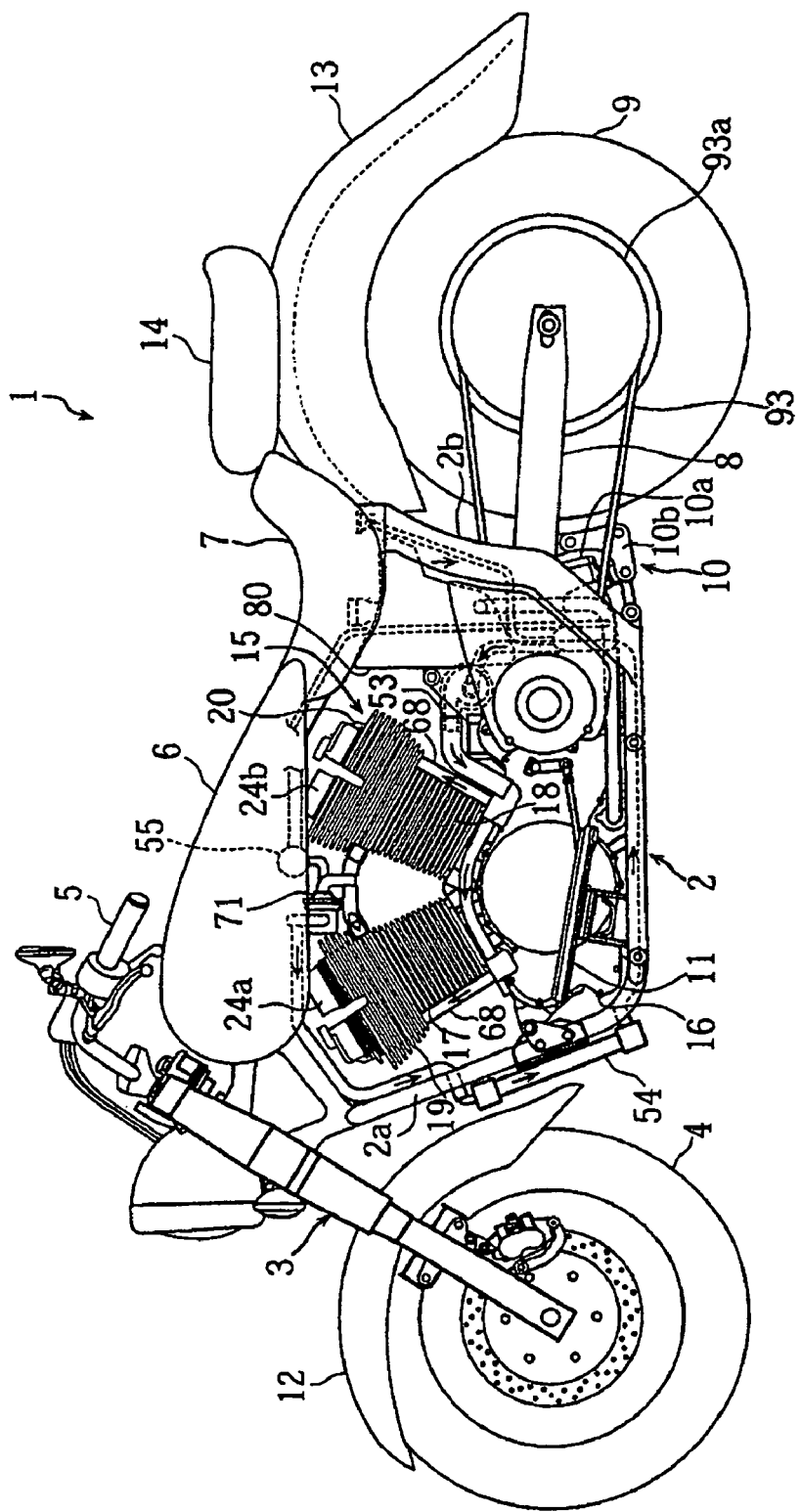
FIG. 1 is a left side view of a motorcycle carrying an engine according to an embodiment of the present invention.
Figure 2:
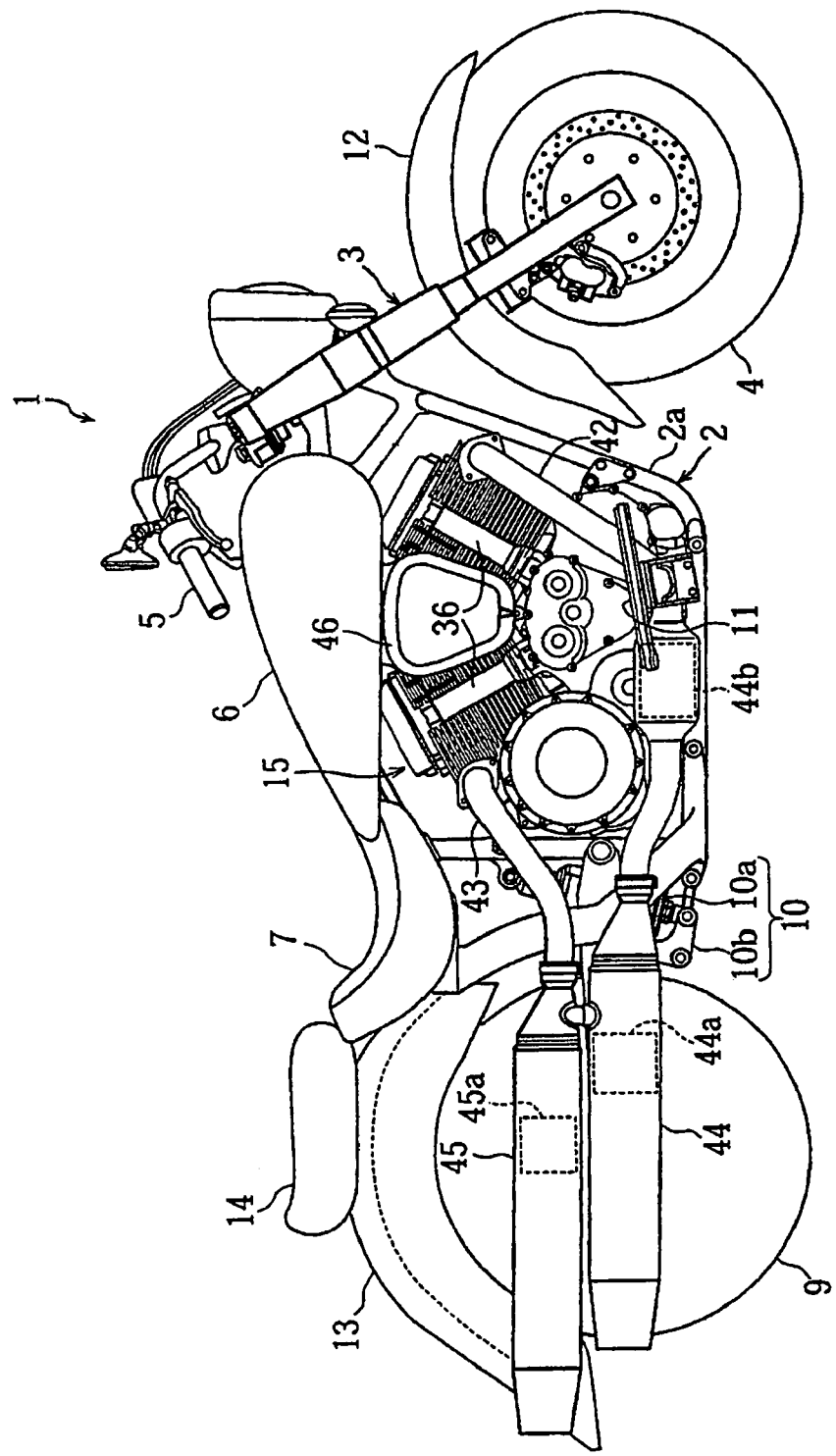
FIG. 2 is a right side view of the motorcycle.
Figure 3:
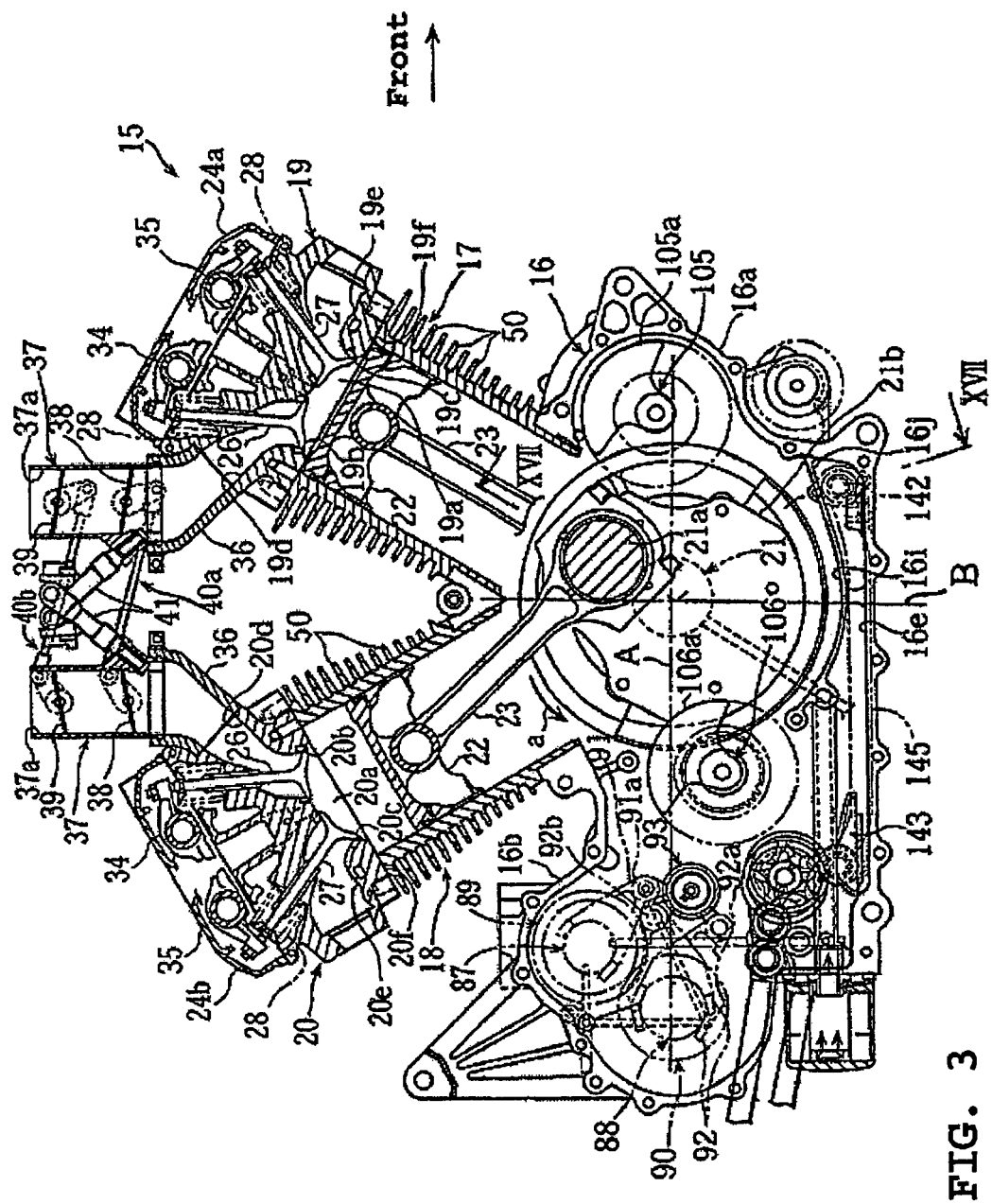
FIG. 3 is a sectional right side view of the engine.
Figure 4:
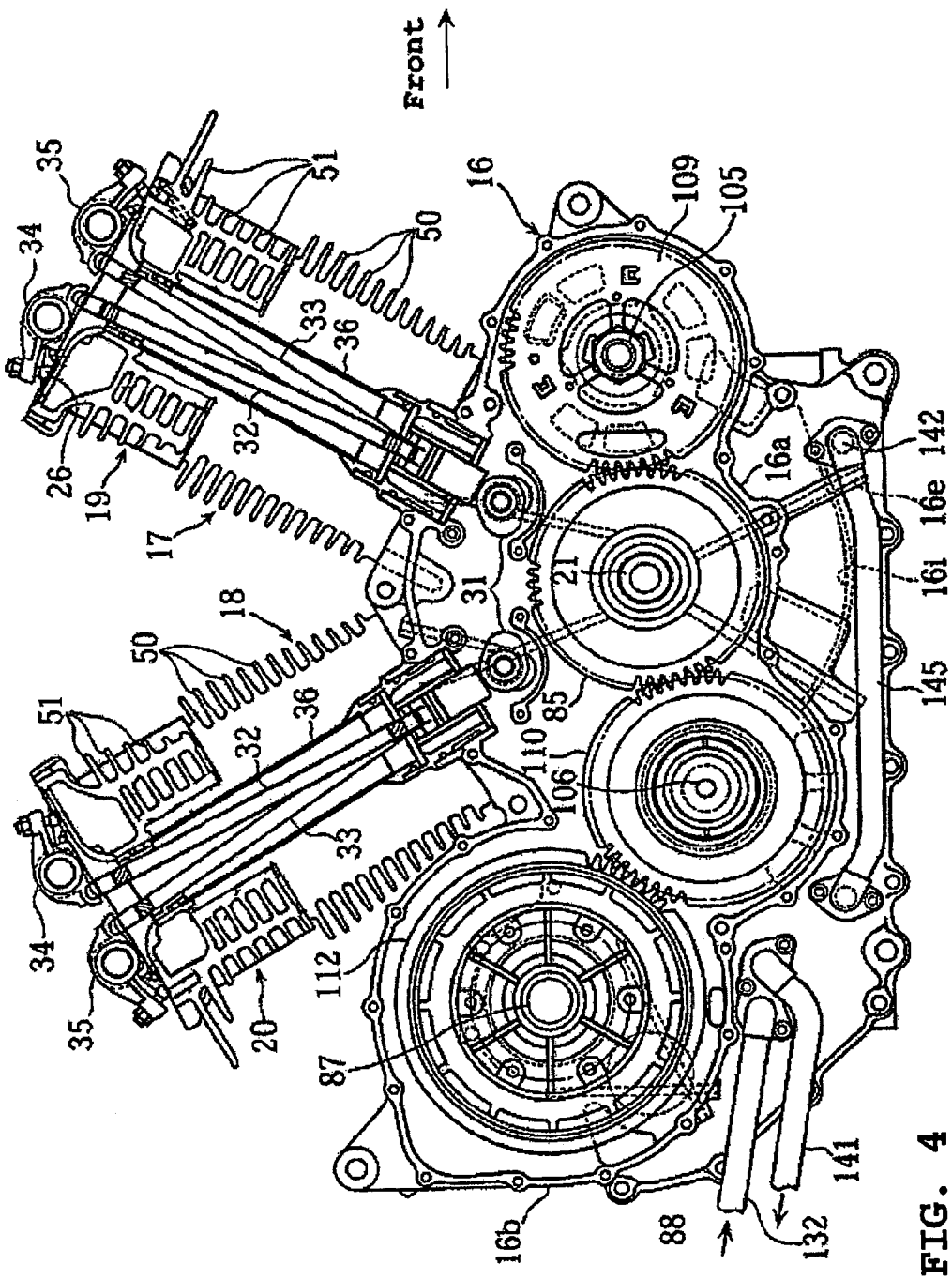
FIG. 4 is a sectional right side view of the engine.
Figure 5:
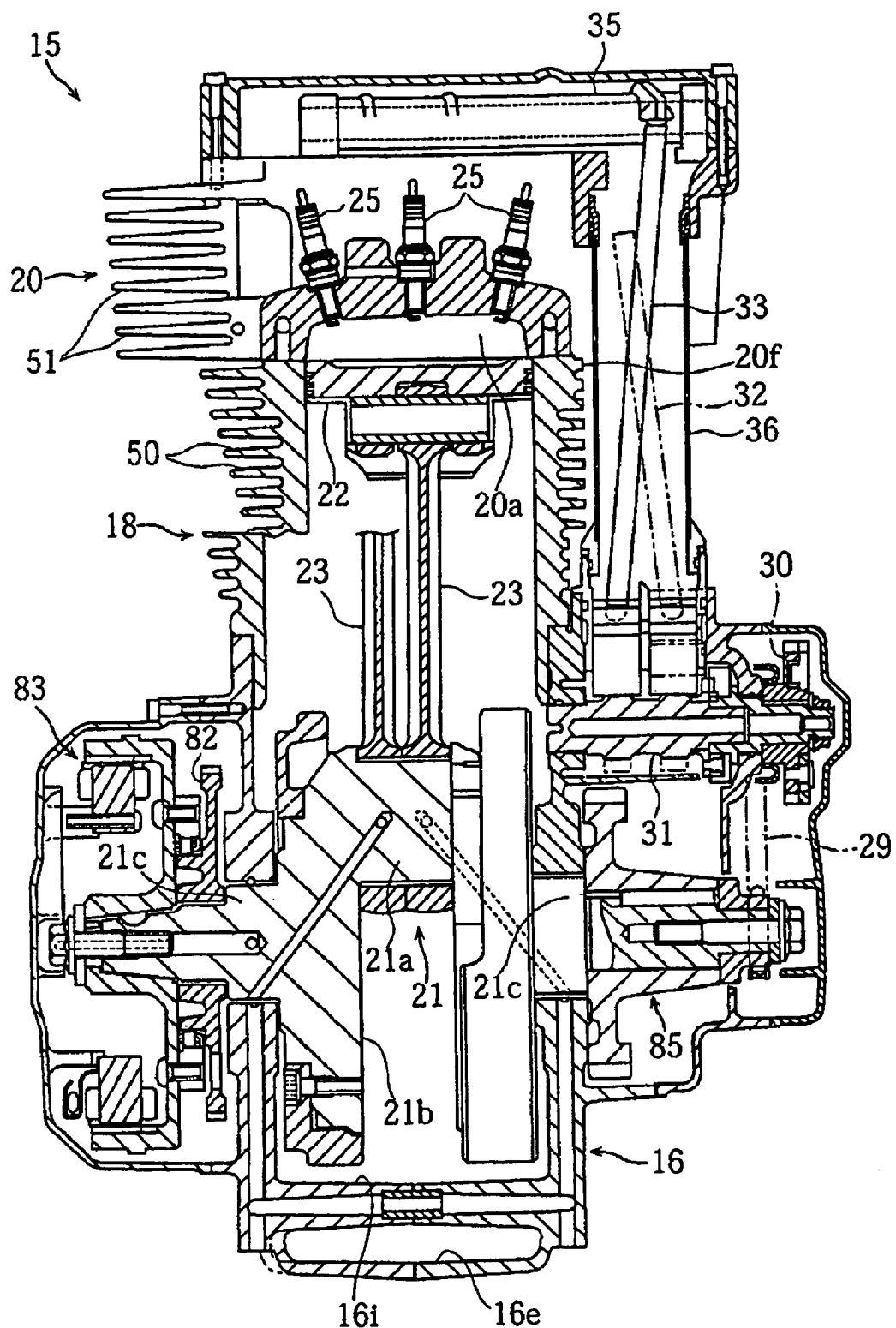
FIG. 5 is a sectional rear view of the engine.
Figure 6:
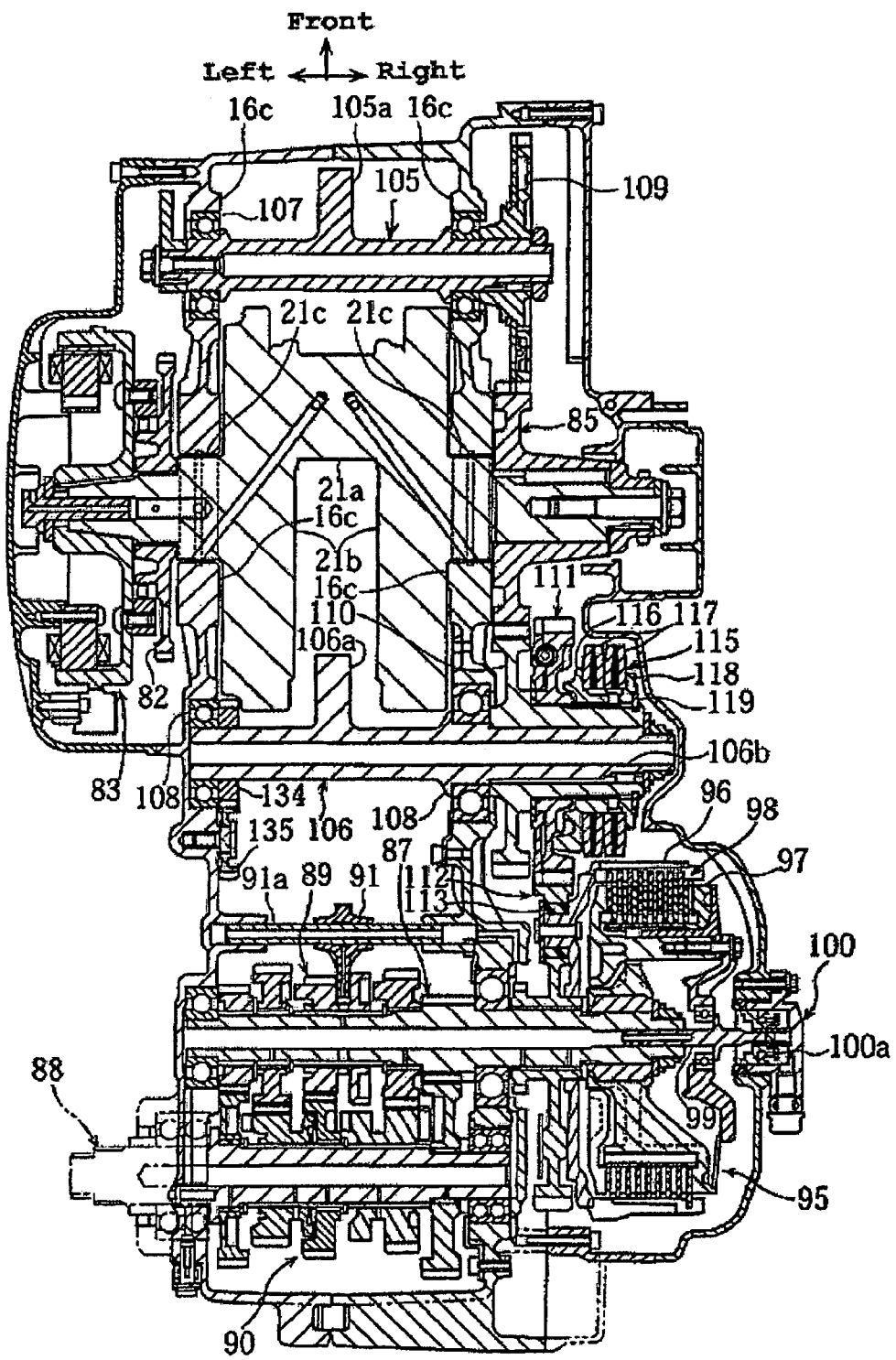
FIG. 6 is a sectional plan view of the engine.
Figure 7:
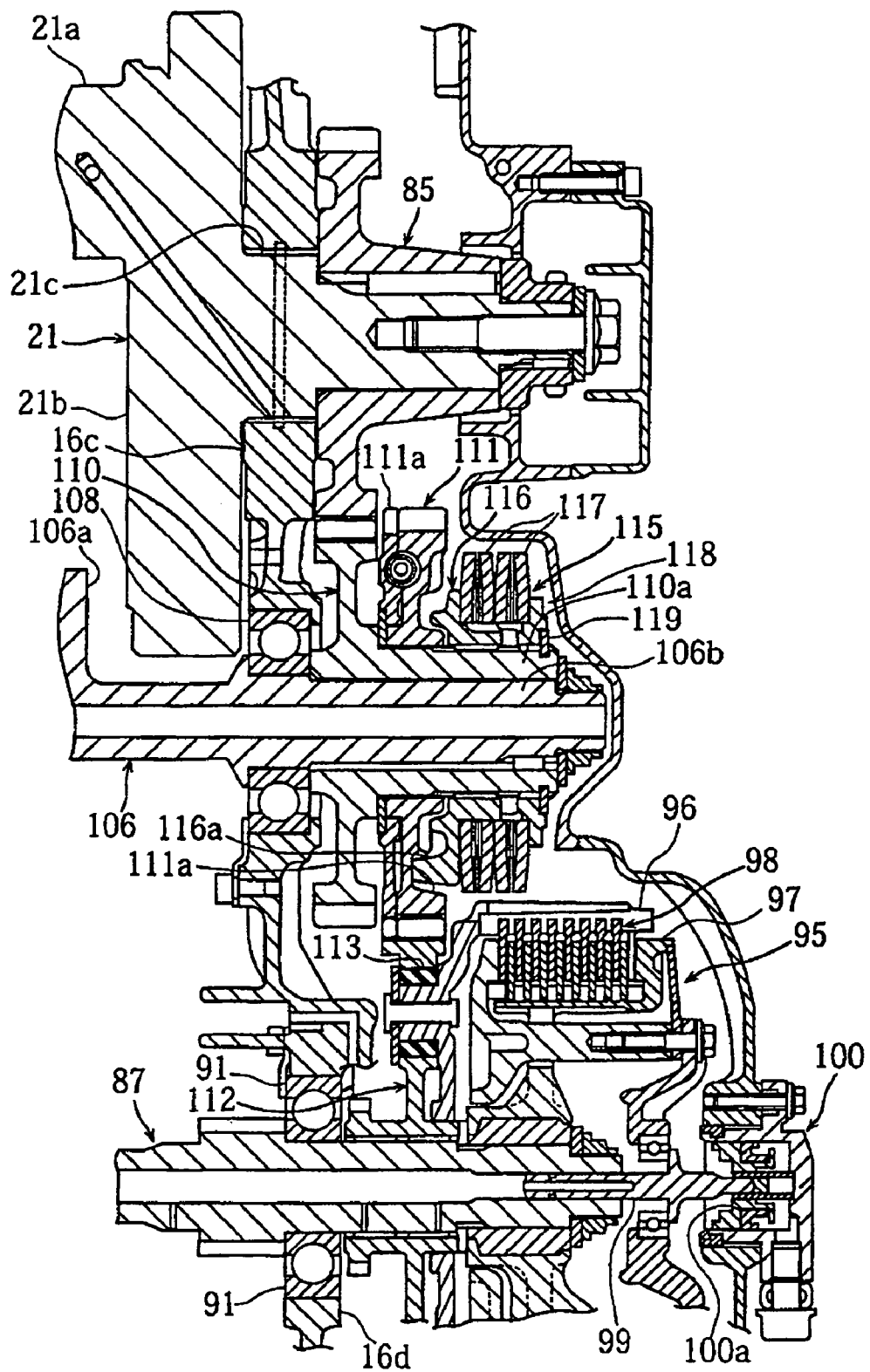
FIG. 7 is a sectional plan view of a power transmission section of the engine.
Figure 8:
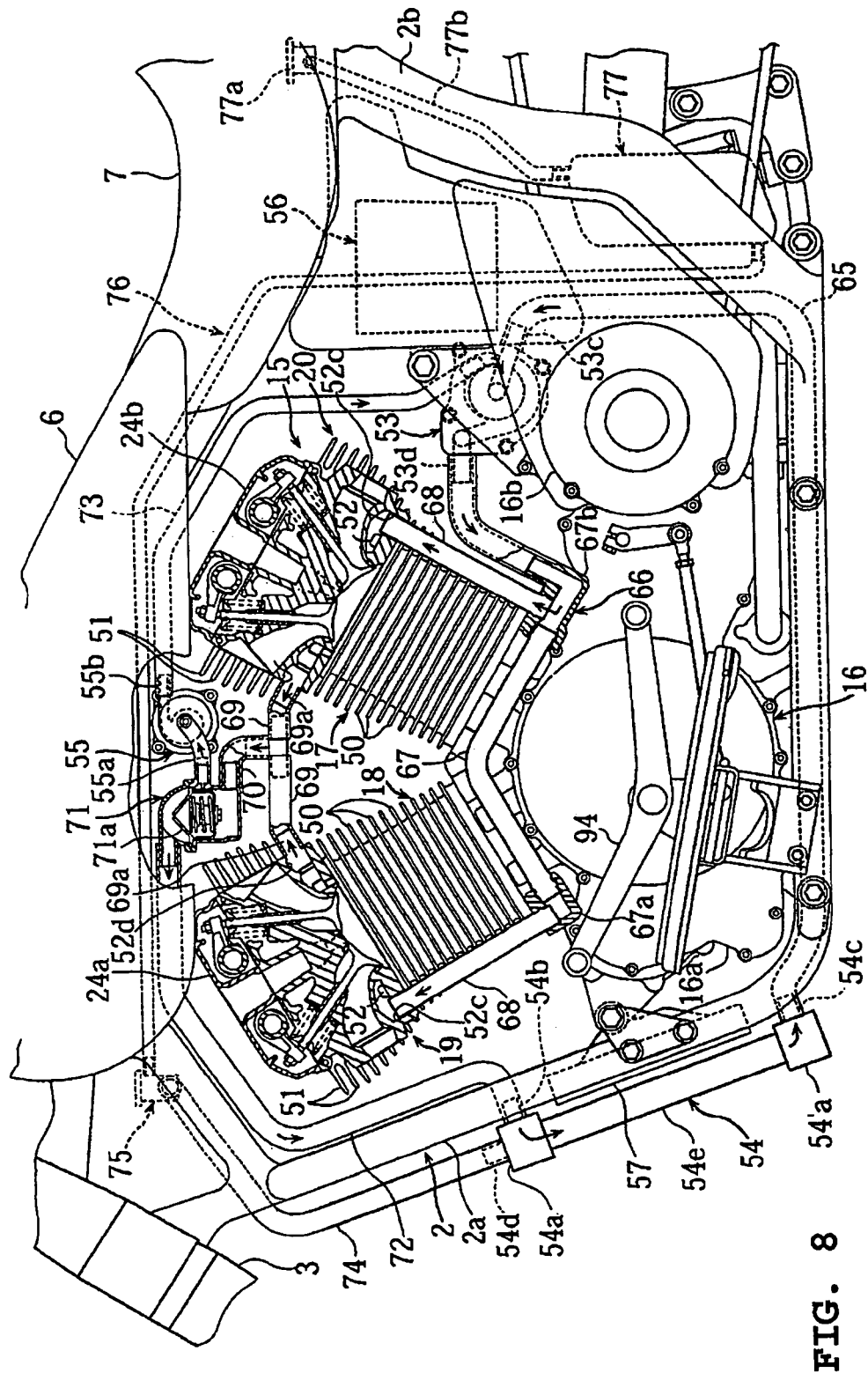
FIG. 8 is an overall view of a partial water cooling system of the engine.
Figure 9:
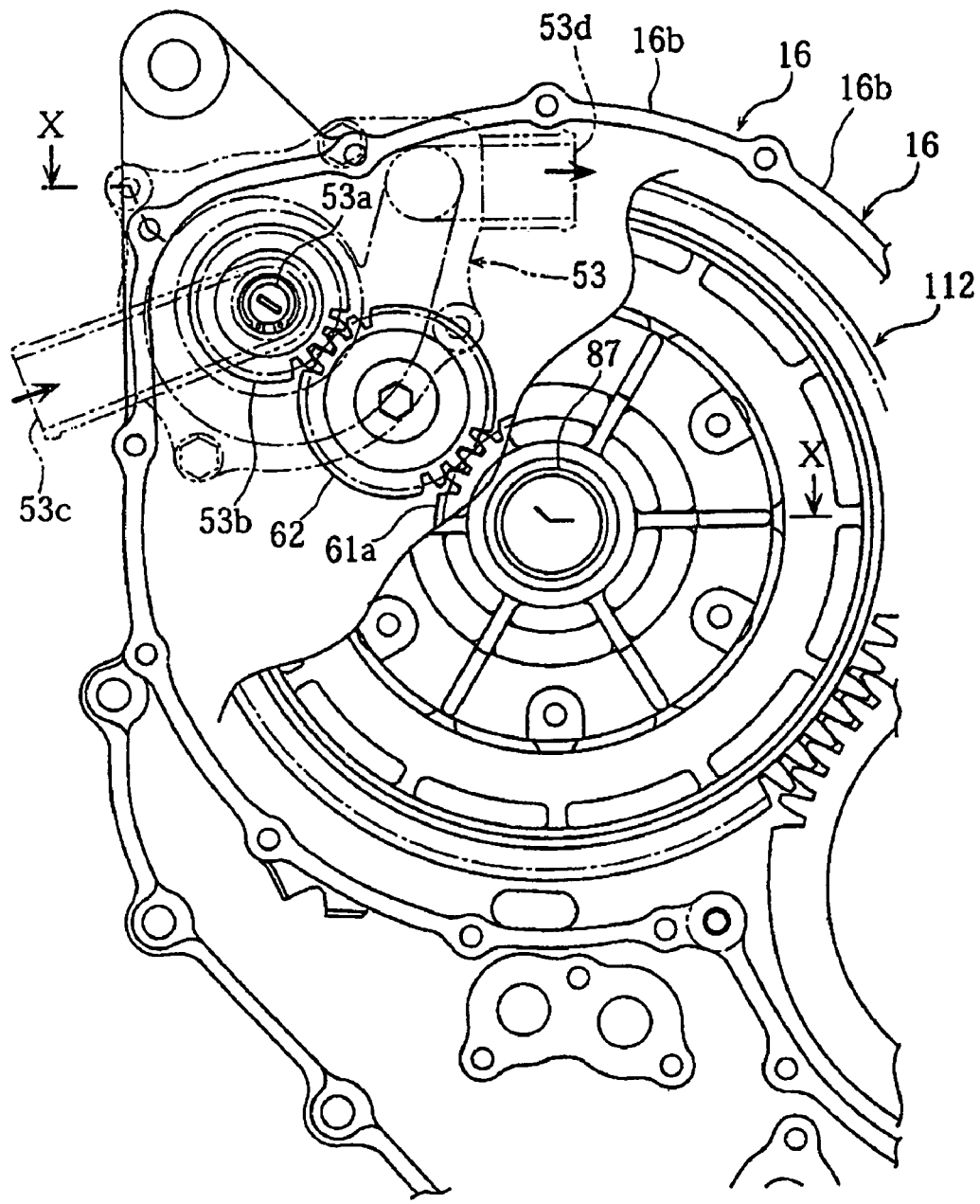
FIG. 9 is a sectional side view of a water pump section of the partial water cooling system.
Figure 10:
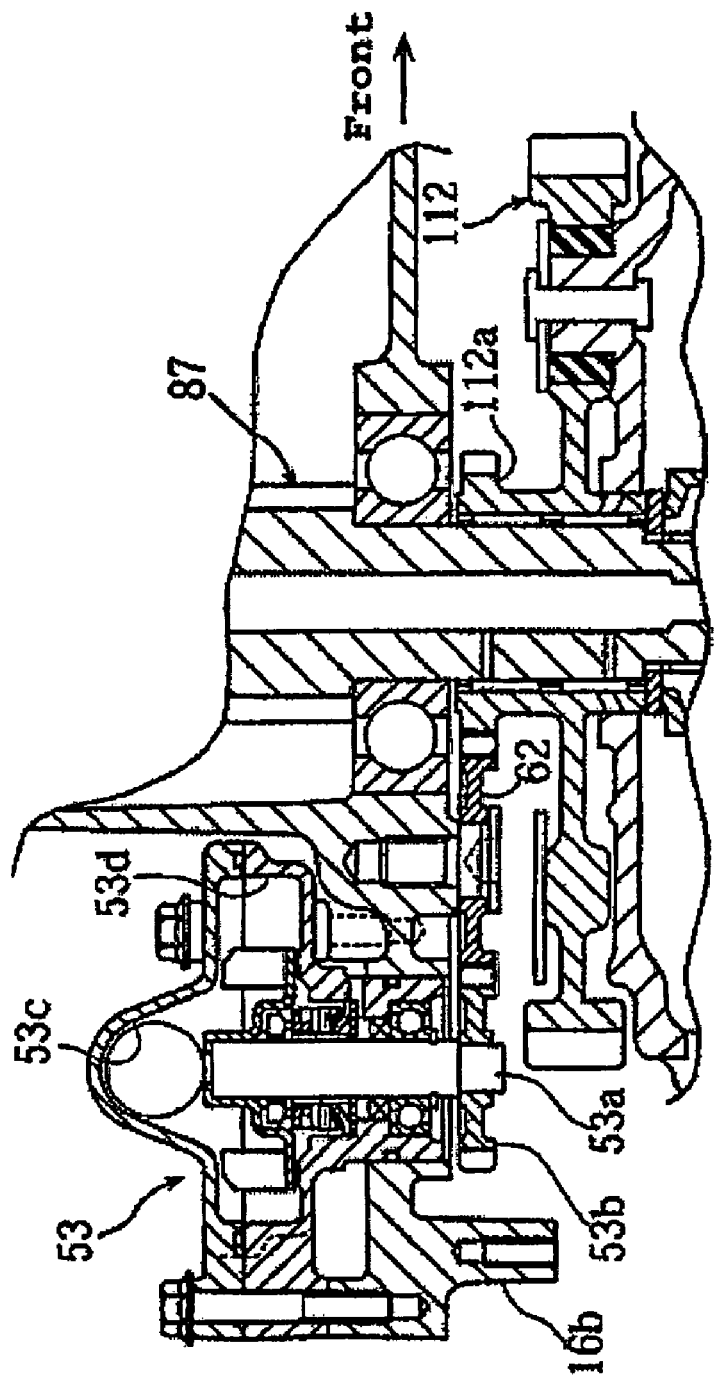
FIG. 10 is a sectional view taken along the line X—X of FIG. 9.
Figure 11:
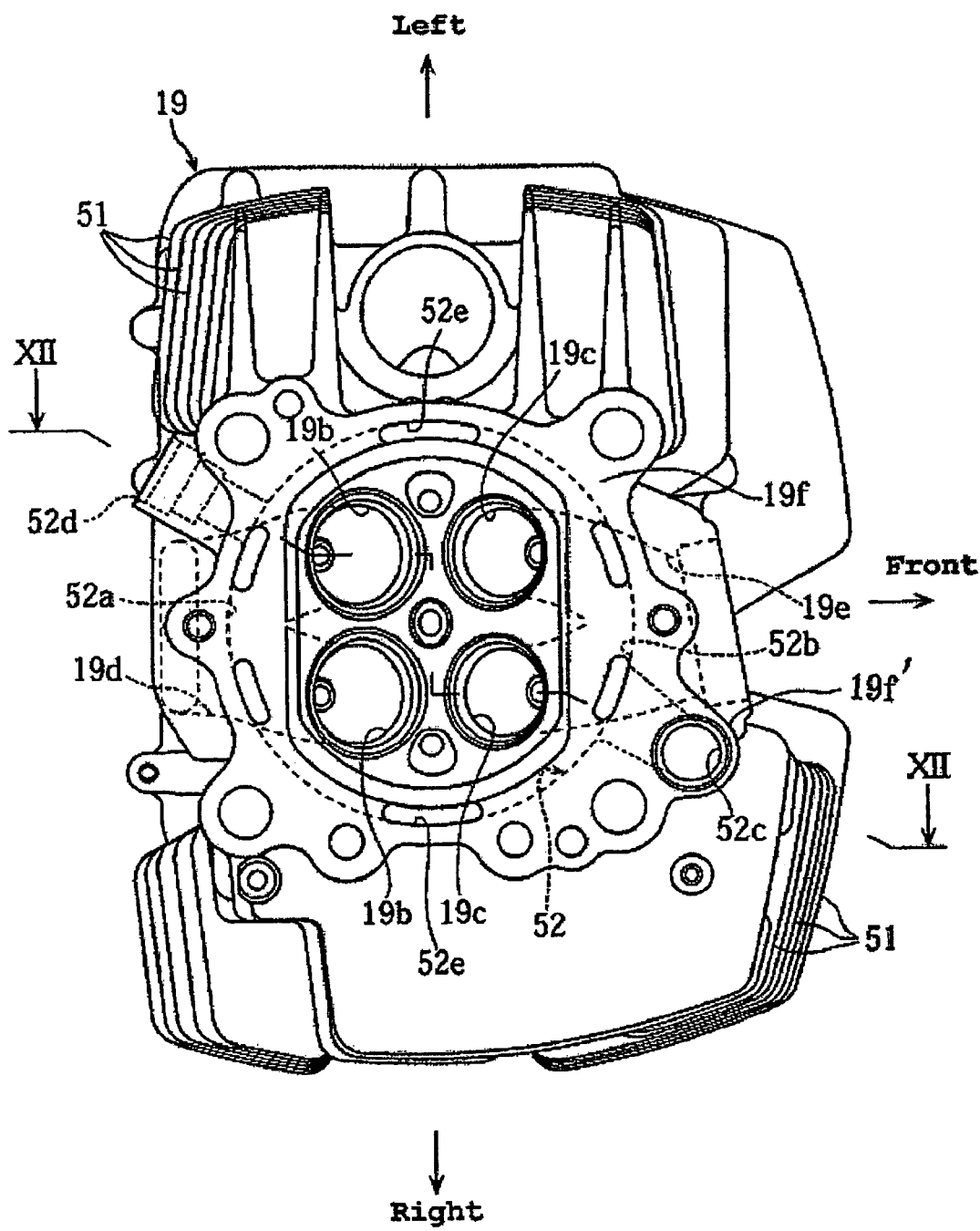
FIG. 11 is a bottom view of a cylinder head.
Figure 12:
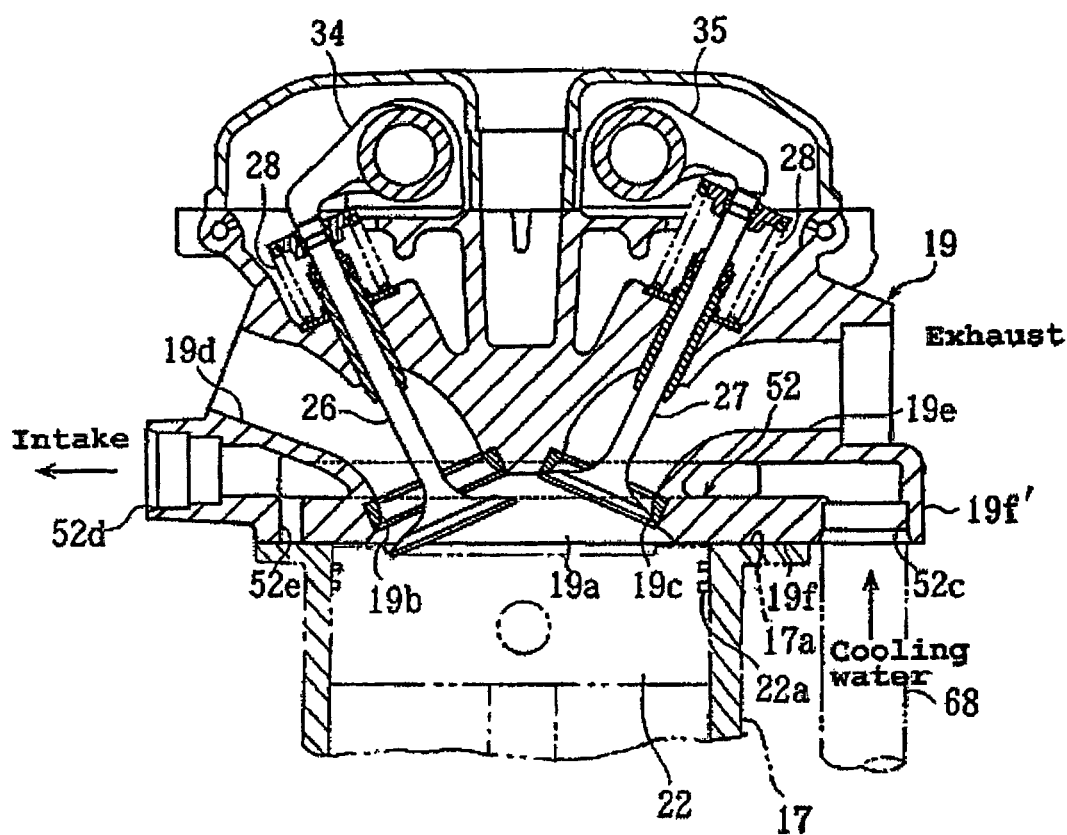
FIG. 12 is a sectional view taken along the line XII—XII of FIG. 11.
Figure 13:
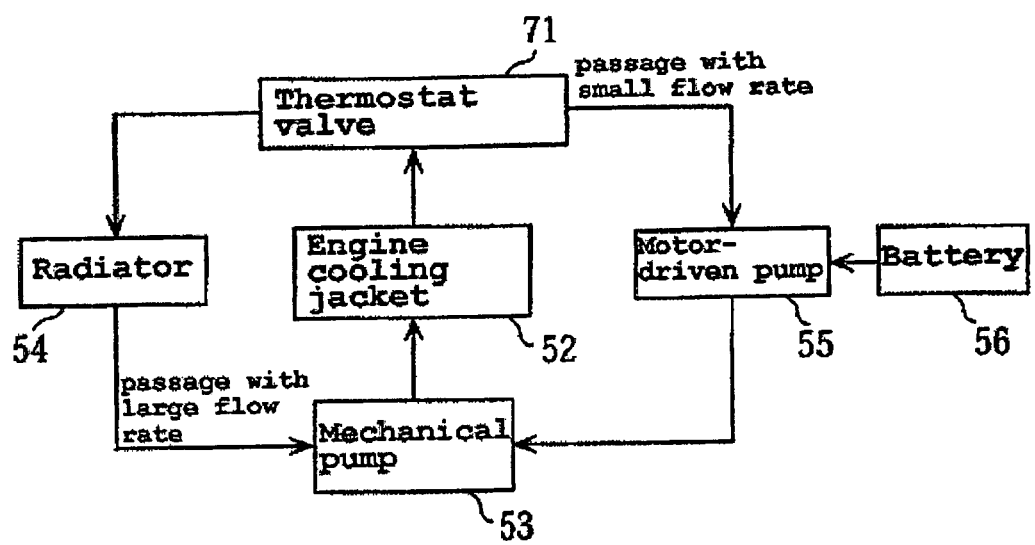
FIG. 13 is a block diagram of the partial water cooling system.
Figure 14:
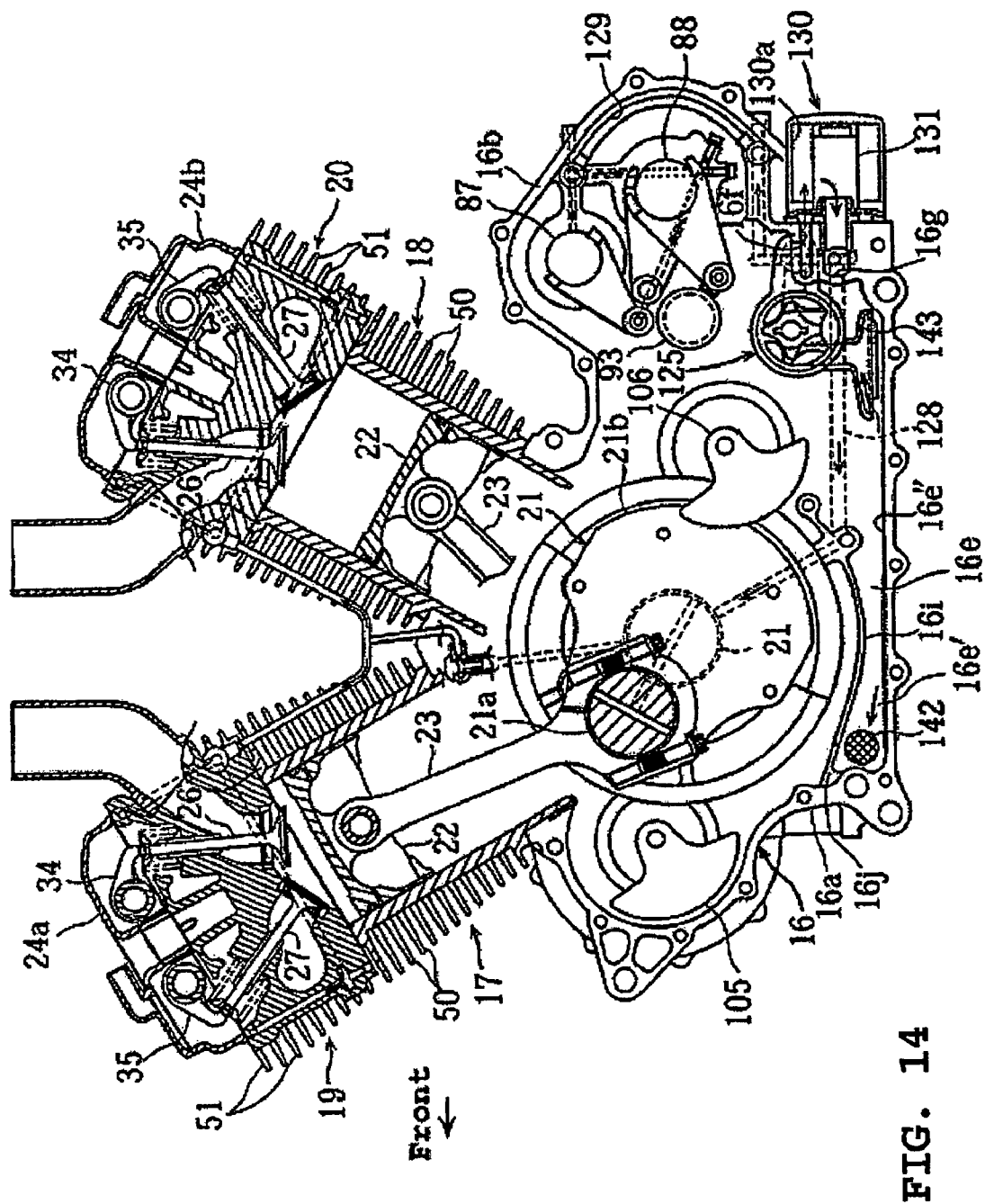
FIG. 14 is a sectional left side view showing a lubrication system of the engine.
Figure 15:
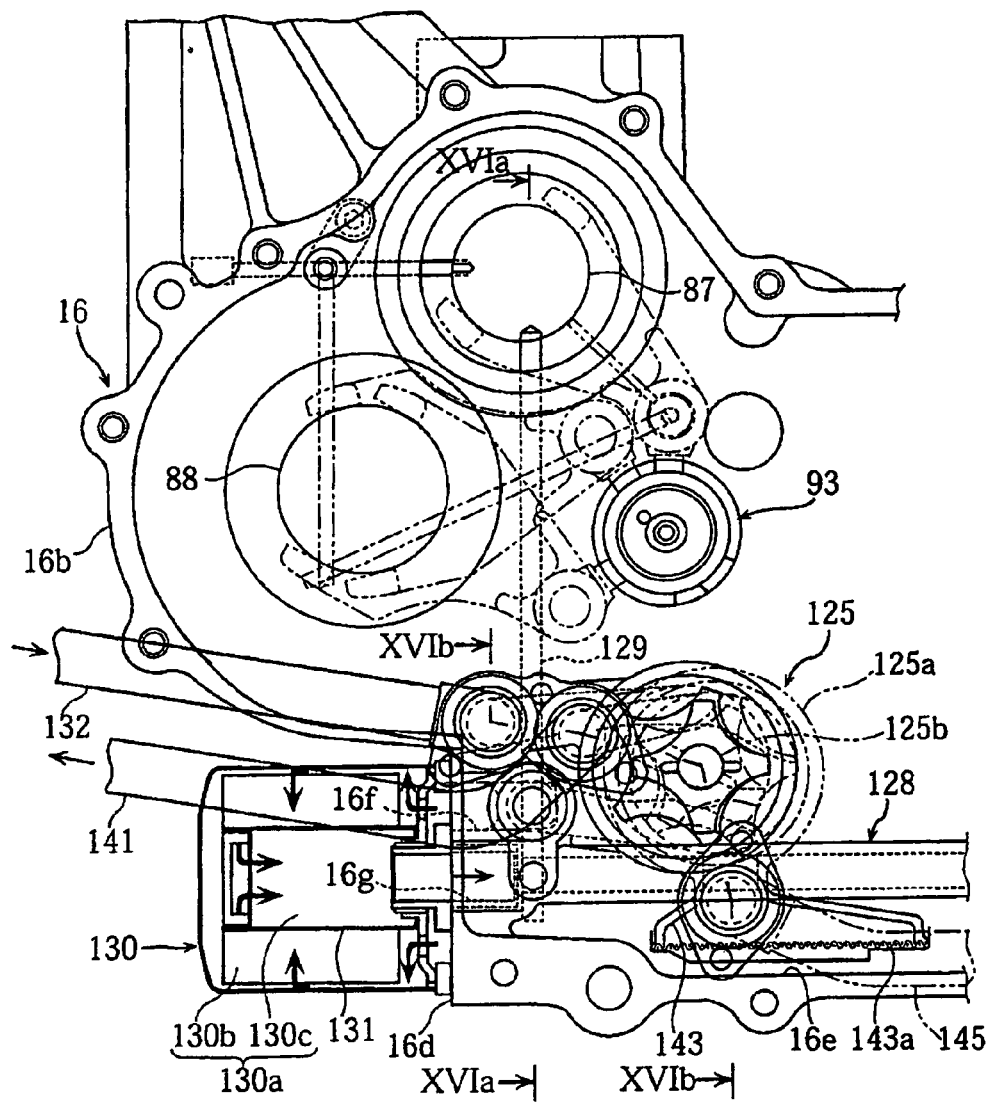
FIG. 15 is a right side view of an oil pump of the engine and its surrounding portion.
Figure 16:
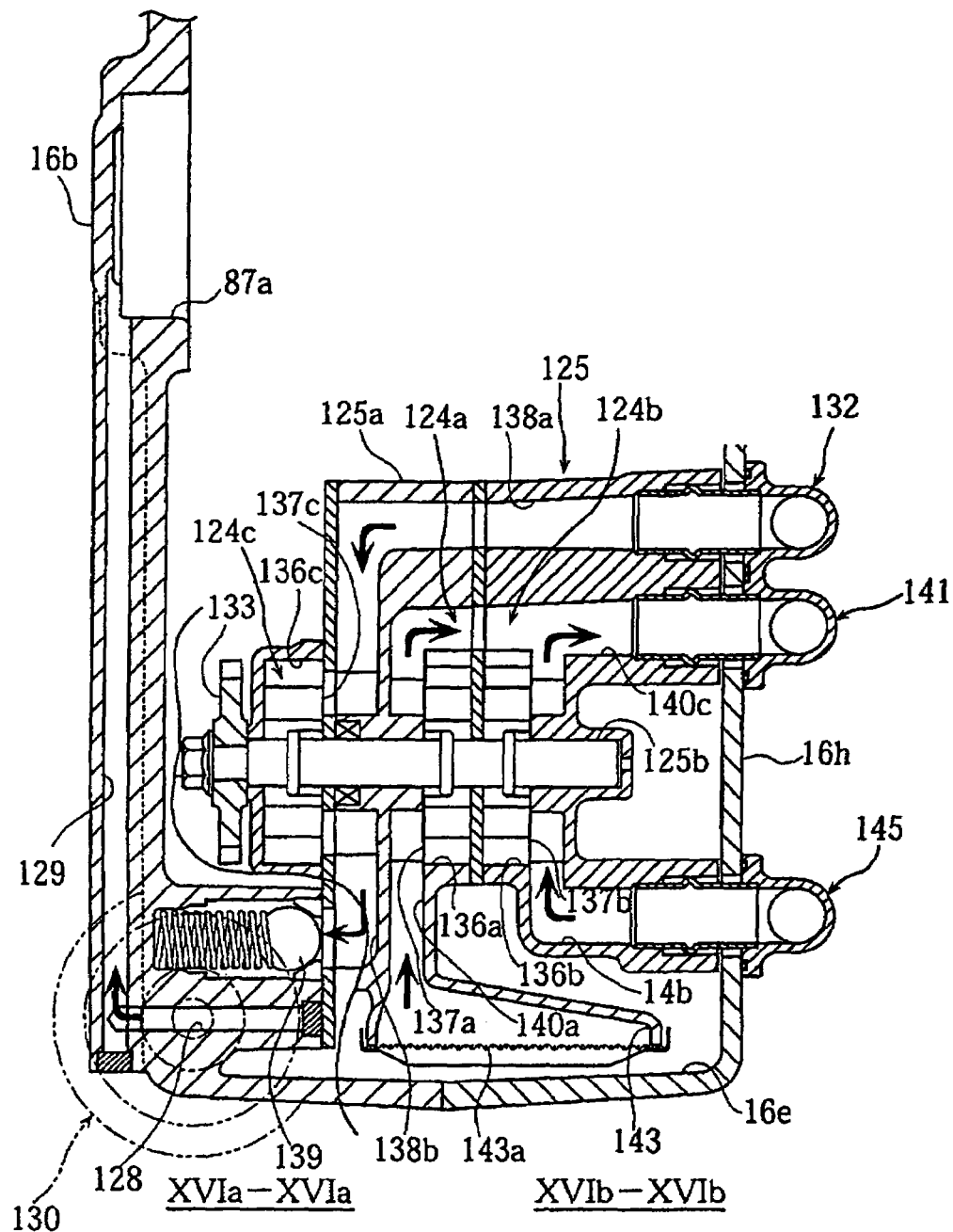
FIG. 16 is a sectional view taken along the line XVIa—XVIa and the line XVIb—XVIb of FIG. 15.
Figure 17:
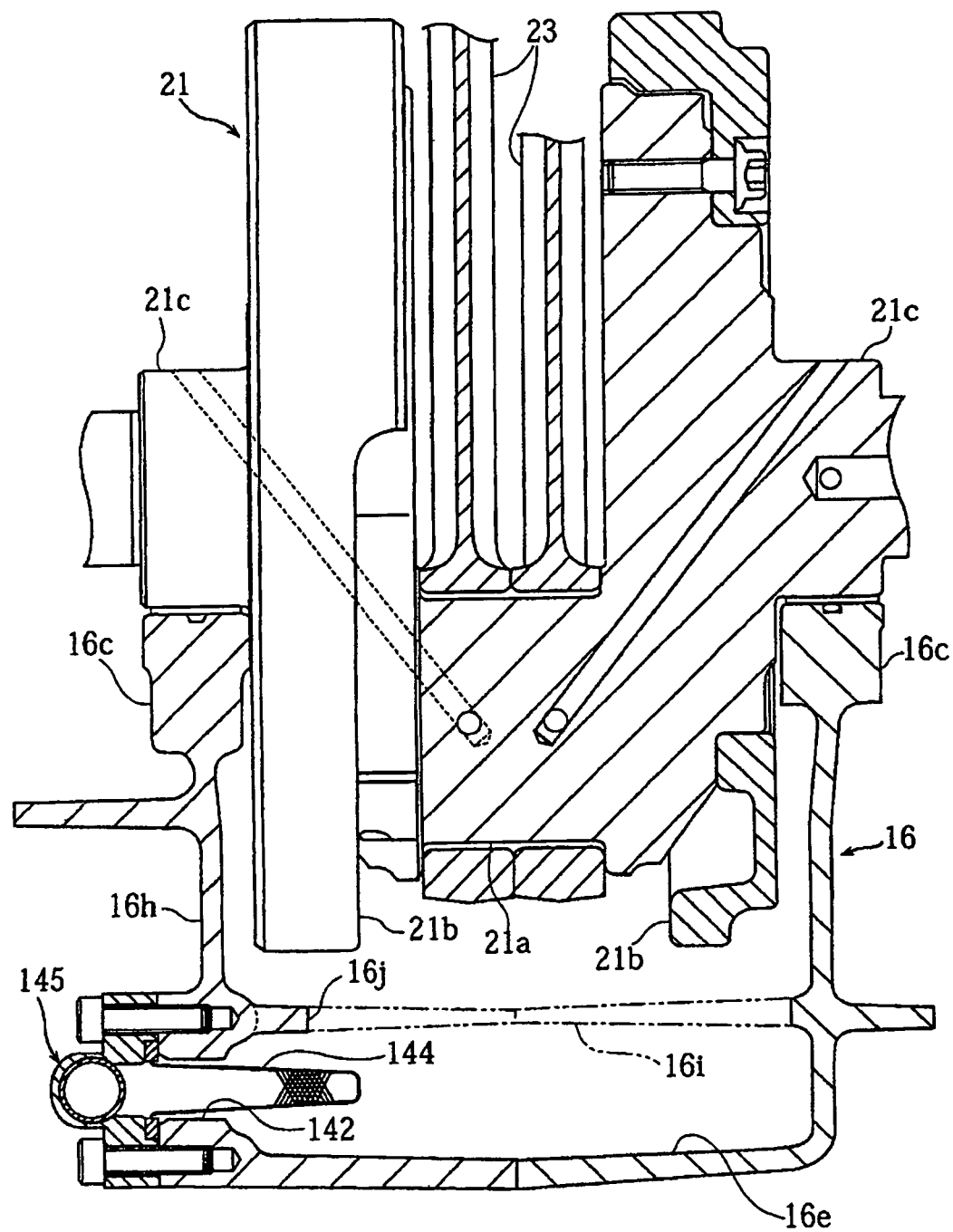
FIG. 17 is a sectional view of an oil sump section of the crankcase of the engine (sectional view taken along the line XVII—XVII of FIG. 3).
Figure 18:
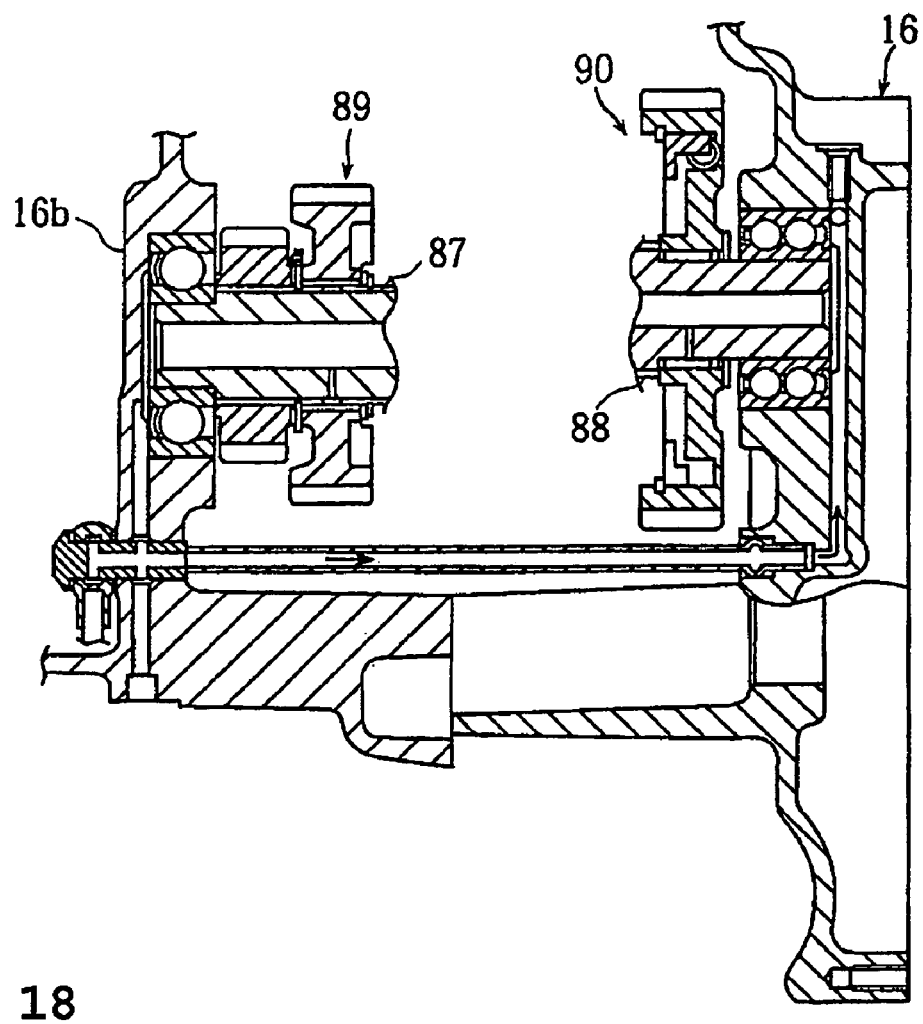
FIG. 18 is a sectional view of a lubrication path of a transmission of the engine.
Figure 19:
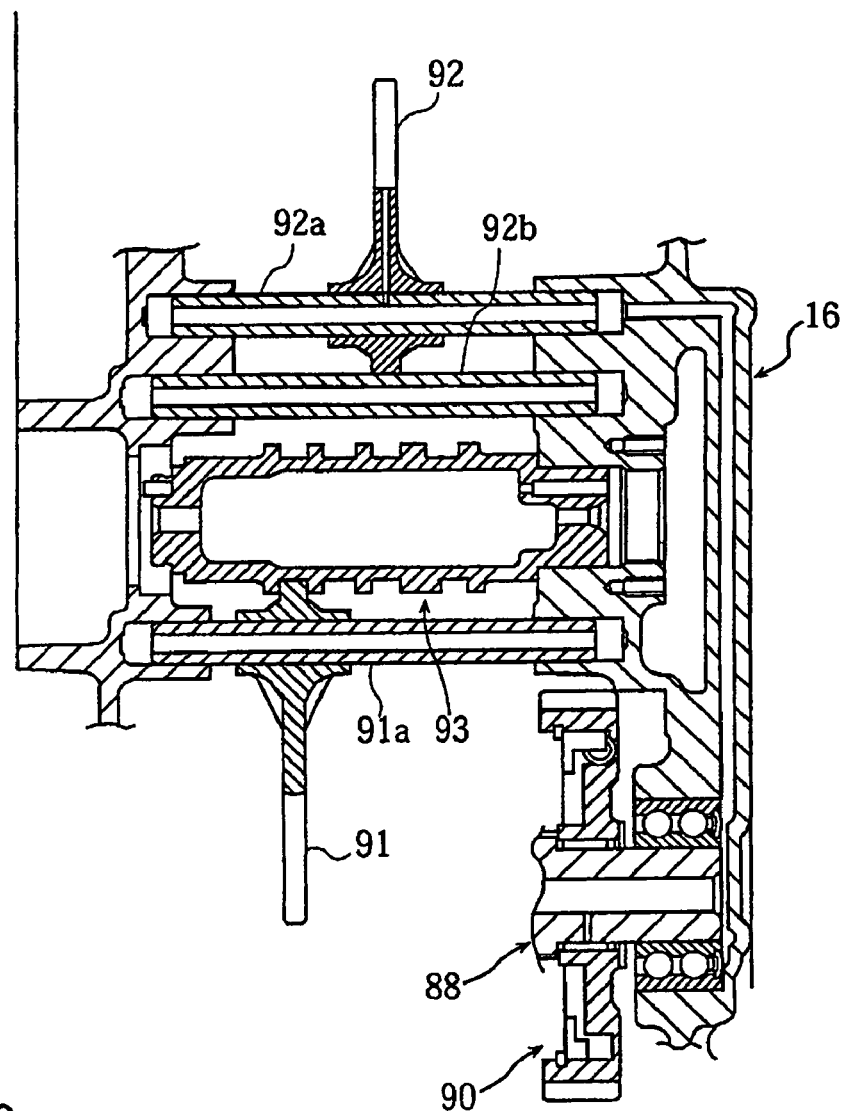
FIG. 19 is a sectional view of a lubrication path of the engine.
Figure 20:
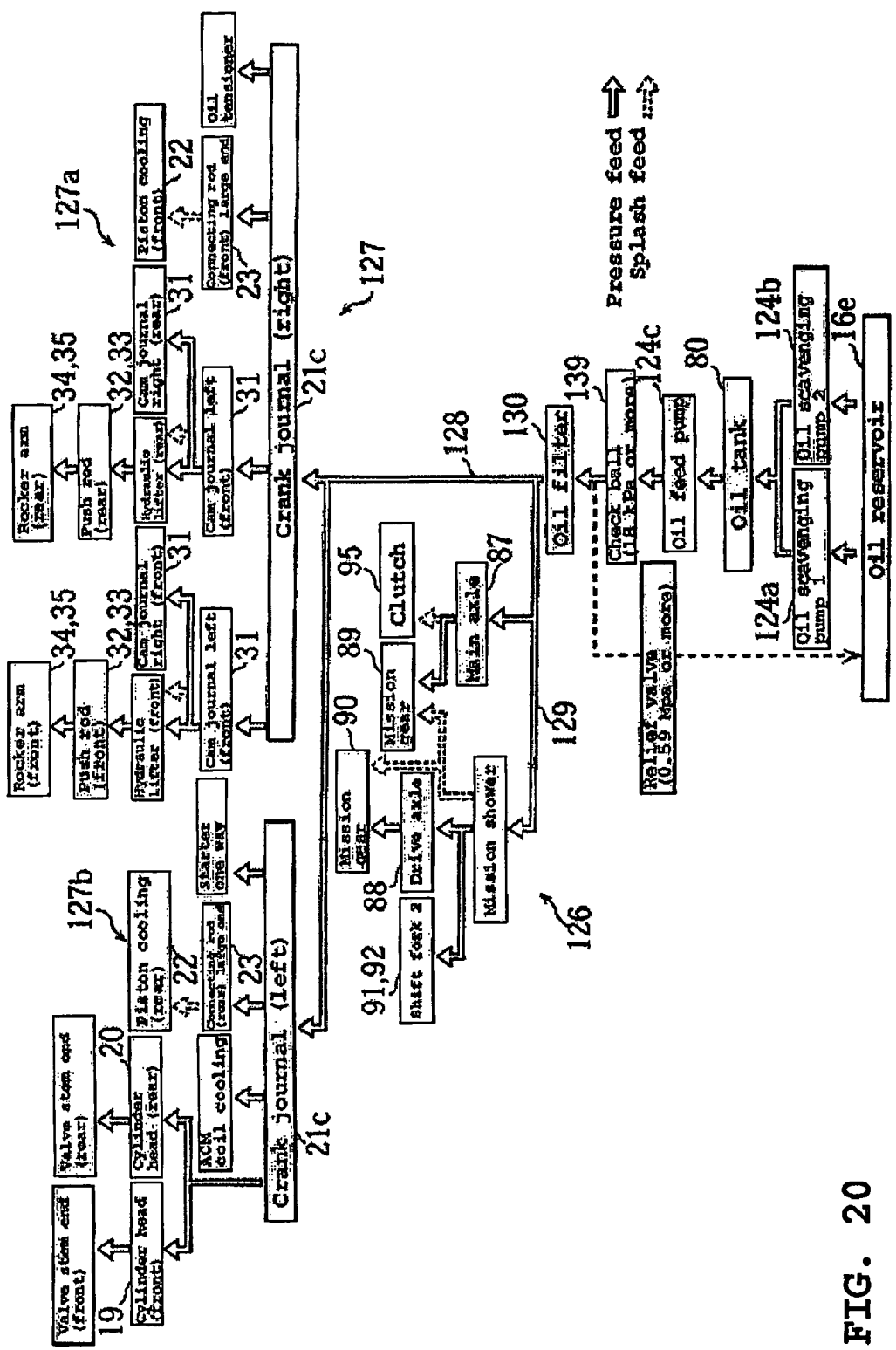
FIG. 20 is a system diagram of a lubricant path of the engine.

FIG. 1–FIG. 20 are views illustrating a balancer structure for an engine according to an embodiment of the present invention. FIG. 1 and FIG. 2 are left side and right side views, respectively, of a motorcycle carrying an engine of this embodiment. FIG. 3 and FIG. 4 are sectional right side views of the engine. FIG. 5 is a sectional rear view of the engine. FIG. 6 is a sectional plan view of the engine. FIG. 7 is a sectional plan view of a power transmission section of the engine. FIG. 8 is an overall view of a partial water cooling system of the engine. FIG. 9 is a sectional side view of a water pump section of the partial water cooling system. FIG. 10 is a sectional view taken along the line X—X of FIG. 9. FIG. 11 is a bottom view of a cylinder head. FIG. 12 is a sectional view taken along the line XII—XII of FIG. 11. FIG. 13 is a block diagram of the partial water cooling system. FIG. 14 is a sectional left side view showing a lubrication system of the engine. FIG. 15 is a sectional side view of an oil pump section of the engine. FIG. 16 is a sectional view taken along the line XVIa—XVIa and line XVIb—XVIb of FIG. 15. FIG. 17 is a sectional view of an oil sump section of the crankcase. FIG. 18 and FIG. 19 are sectional views of a transmission. FIG. 20 is a block diagram showing a lubricant path of the engine. Here, terms "front and rear" and "left and right" referred to in this embodiment means "front and rear" and "left and right" when viewed by a driver on the seat.

In these figures, reference numeral 1 designates a motorcycle of a cruiser type. The motorcycle 1 has a general construction whose outline is described below. A front fork 3 is supported by a head pipe (not shown) fixed at the front end of a body frame 2 of a double cradle type. A front wheel 4 is supported at the lower end of the front fork 3 and a steering handle 5 is disposed at the upper end. A fuel tank 6 and a seat 7 are disposed at the upper part of the body frame 2 and a rear wheel 9 is supported at the rear end of a rear arm 8 supported on a rear arm bracket 2b for an up and down swinging movement.

Between the rear arm 8 and the body frame 2 is disposed a rear suspension 10 made up of a shock absorber 10a and a link mechanism 10b. Foot rest boards 11 for supporting a driver's feet are disposed at the sides of left and right down tubes 2a of the body frame 2.

A front fender 12 for covering the upper part of the front wheel 4 is attached to the front fork 3. A rear fender 13 for covering approximately the upper half of the rear wheel 9 is attached to a rear frame (not shown) extending rearward from the upper end of the rear arm bracket 2b and a rear seat 14 is disposed on the upper side of the rear fender 13.

An engine 15 is mounted in a cradle of the body frame 2. The engine 15 is an air-cooled, four-stroke, OHV and V-type, two-cylinder engine, the construction of which is as follows. A front cylinder block 17 and a rear cylinder block 18 are disposed on the upper surface of a crankcase 16, making a given angle to each other in the longitudinal direction. A front cylinder head 19 and a rear cylinder head 20 are piled on the upper mating surfaces of the front and rear cylinder blocks 17, 18, respectively, for the connection with head bolts. In addition, head covers 24a, 24b are mounted on the upper mating surfaces of the cylinder heads 19, 20.

The crankcase 16 has a construction in which a crankcase section 16a containing a crankshaft 21, and a mission case section 16b containing a transmission mechanism (described later) are formed integrally. The crankshaft 21 is disposed horizontally in the lateral direction, the rotational direction of which is set to be counter-clockwise as seen from the right side of the vehicle (see arrow [a] in FIG. 3). The crankshaft 21 has a crank pin 21a common to the front and rear cylinders, left and right crank arms 21b, as well as crank journals 21c.

The front and rear cylinder blocks 17, 18 have cylinder bores of diameter over 100 mm, respectively. Pistons 22 are each inserted in the respective cylinder bores for sliding movement and the pistons 22 are connected to a crank pin 21a of the crankshaft 21 common to the front and rear cylinders, through connecting rods 23.

In the lower mating surfaces (mating surfaces on the cylinder block side) 19f, 20f of the front and rear cylinder heads 19, 20, combustion recesses 19a, 20a each constituting the ceiling of the combustion chamber, respectively, are formed, facing the cylinder bores, and three ignition plugs 25 are screwed in each combustion recess 19a, 20a, at certain intervals in the lateral direction. The combustion recesses 19a, 20a are formed with two intake valve openings 19b and 20b and two exhaust valve openings 19c and 20c, respectively.

Intake valves 26 and exhaust valves 27 are disposed in the intake valve openings 19b, 20b and in the exhaust valve openings 19c, 20c, respectively, such that they are adapted to open and close their respective openings and biased towards a valve closing by coil springs 28. Regarding the intake valve 26 and the exhaust valve 27, as shown in FIG. 4 and FIG. 5, the intake side and the exhaust side push rods 32, 33 are advanced upwardly and retracted downwardly through front and rear cam shafts 31 rotated by the crankshaft 21, and the push rods 32, 33 cause the intake side and the exhaust side rocker arms 34, 35 to rock, whereby they are driven to be opened/closed. The cam shafts 31 are provided, parallel to the crankshaft 21, in the crankcase 16 and rotated by the crankshaft 21 through a chain 29, a middle shaft (not shown) and a timing gear 30.

The intake side and exhaust side push rods 32, 33 are contained in cylindrical casings 36 provided along the cylinder axes of the front and rear cylinder blocks 17, 18 and exposed to the right side.

The intake valve openings 19b, 20b of the front and rear cylinder heads 19, 20 are led out to the inside wall of the V-bank through each joined flow intake port 19d, 20d. To the front and rear intake ports 19d, 20d are connected throttle bodies 37 through front and rear intake pipes 36, with their axes oriented approximately vertically, and to an air inlet 37a of each throttle body 37 is connected a common air cleaner 46.

A main throttle valve 38 is provided on the downstream side of the throttle body 37 and a sub-throttle valve 39 on the upstream side. Valve shafts of the front and rear main throttle valves 38 are connected to each other and those of the sub-throttle valves 39 are connected to each other through link mechanisms 40a, 40b, respectively.

Fuel injection valves 41 are mounted to the front and rear throttle bodies 37 on the downstream side from the throttle valves 38, respectively, and the injection head of the fuel injection valve 41 is disposed such that fuel is injected towards the back of the intake valve 26.

The exhaust valve openings 19c, 20c of the front and rear cylinder heads 19, 20 are led out to the outside wall of the V-bank through joined flow intake ports 19e, 20e. To the front and rear exhaust ports 19e, 20e are connected front and rear exhaust pipes 42, 43, as shown in FIG. 2. The exhaust pipes 42, 43 extend rearward on the right side of the body and to the downstream ends of the exhaust pipes are connected front and rear mufflers 44, 45 provided at the right side of the rear wheel 9.

Catalysts 44a, 45a for purifying exhaust gas are provided in the front and rear mufflers 44, 45, respectively. An auxiliary catalyst 44b is provided in the middle of the front exhaust pipe 42. Since the front exhaust pipe 42 has the length larger than that of the rear exhaust pipe 43, activation of the catalyst 44a is apt to be delayed during warming up of the engine. Therefore, the auxiliary catalyst 44b is provided in the front exhaust pipe 42 to accelerate exhaust gas purification during warming up.

Now, the cooling structure of the air-cooled engine 15 will be described with reference mainly to FIG. 8–FIG. 13.

Numerous cooling fins 50, 51 are formed integrally on the outside walls of the front and rear cylinder blocks 17, 18 and front and rear cylinder heads 19, 20, at approximately right angles to the axes of the bores. The running wind blows directly on the cylinder blocks 17, 18 and cylinder heads 19, 20, so that heat from the engine is released through the cooling fins 50, 51 for the cooling of the engine 15.

The air-cooled engine 15, while mainly utilizing air-cooling by the wind, is provided with a partial water cooling system operated with cooling water, the construction of which is described below. The same cooling structures are used both in the front side and the rear side cylinder, and description will be made for the front side cylinder.

In this embodiment, a cooling jacket is formed only between a virtual surface of approximately a truncated conical shape generated by a bottom line of the intake port 19d or exhaust port 19e being rotated about the cylinder axis, which bottom line appearing when the front cylinder head 19 is cut by a plane including the cylinder axis and perpendicular to the crankshaft 21, and a plane including a piston ring 22a in the lower end of the piston 22 positioned at the top dead center.

More specifically, the front cylinder head 19 is formed with an annular cooling jacket 52, of about 60 cc in volume, surrounding the peripheral portion of the combustion recess 19a and passing through the cylinder head 19 between the intake and exhaust ports 19d, 19e and lower mating surface 19f. A portion between intake valves 52a of the cooling jacket 52 corresponding in position to the region between the intake valve openings 19b and a portion between exhaust valves 52b corresponding in position to the region between the exhaust valve openings 19c have larger passage areas than the other.

In the lower mating surface 19f of the front cylinder head 19 at the exhaust port 19e side is formed an overhang portion 19f overhanging outward from the mating surface 17a of the cylinder block 17. In the overhang portion 19f, a cooling water supply port 52c is formed therethrough for communication with the cooling jacket 52. Also, a cooling water discharge port 52d in communication with the cooling jacket 52 is open at the inside wall of the V-bank of the front cylinder head 19 below the intake port 19d. The cooling water discharge port 52d is located higher than the cooling water supply port 52c, which prevents generation of air pockets in the cooling jacket 52. Reference numeral 52e designates a hole used for removing core sand when the cooling jacket 52 is casted, which is closed by a gasket placed between the cylinder block and cylinder head. Cooling water supplied from the cooling water supply port 52c first cools the region around the exhaust port 19e at the highest temperature and flows towards the intake port 19d to be discharged from the cooling water discharge port 52d.

The partial water cooling system is provided with a mechanical pump 53 driven for rotation by the crankshaft 21, a radiator 54 for cooling the cooling water supplied to the cooling jacket 52 with cooling water, and a motor-driven pump 55 for circulating the cooling water in the cooling jacket 52 for a given time such that the cooling water bypasses the radiator 54 when stoppage of the engine 15 causes the mechanical pump 53 to stop.

The radiator 54 is provided in front of and at the lower ends of the vertical portions of the left and right down tubes 2a of the body frame 2, and a cooling fan 57 is disposed behind the radiator 54 such that it is located between the left and right vertical portions. The radiator 54 includes upper and lower headers 54a, 54a' connected by an element 54e having radiating fins, a cooling water inlet 54b formed in the back of the upper header 54a, a cooling water outlet 54c in the back of the lower header 54a' and a cooling water filler port 54d formed at the top of the upper header 54a. The radiator 54 is disposed such that the upper header (upper end portion) 54a is positioned at approximately the same height as the lower end of the front cylinder block 17 when viewed from the front of the vehicle.

The mechanical pump 53 is disposed upward of a main shaft 87 (described later) provided in the mission case section 16b, with the pump shaft 53a oriented in the direction parallel to the main shaft 87. A pump gear 53b fixed to the pump shaft 53a is meshed, through a middle gear 62, with a drive gear 112a formed integral with a large reduction gear 112 mounted on the main shaft 87 for relative rotation. This allows the mechanical pump 53 to be driven for rotation at all times by the crankshaft 21 during engine operation.

The cooling water outlet 54c of the radiator 54 is connected to a cooling water suction port 53c of the mechanical pump 53 by a cooling hose 65. The cooling hose 65 is laid along the horizontal portion of the down tube 2a at the inner side.

A supply pipe 66 is connected to a delivery port 53d of the mechanical pump 53. The supply pipe 66 includes a main supply pipe 67 in the shape of the letter C laid along the left upper wall of the crankcase 16 and front and rear branch pipes 68 connected to the base and the leading end of the main supply pipe 67 through joints 67a, 67b and rising along the cylinder axes of the front and rear cylinder blocks 17, 18. The upper ends of the branch pipes 68 are connected to the cooling water supply ports 52c of the cylinder blocks 17, 18, respectively. The front and rear branch pipes 68 are disposed such that parts of the pipes are buried in recesses formed on the cylinder blocks 17, 18, with cooling fins 50 being cut out and the remaining parts are exposed to the outside, to be cooled by the wind.

To the cooling water discharge ports 52d of the front and rear cylinder heads 19, 20 are connected discharge pipes 69 through joints 69a, respectively, and to the exhaust pipes 69 is connected one joined pipe 70. An exhaust hose 72 is connected to the joined flow pipe 70 through a thermostat 71, and the downstream end of the exhaust hose 72 is connected to the cooling water inlet 54b of the radiator 54. The thermostat 71 is disposed under the fuel tank 6 in the V-bank and adapted to establish communication between the joined flow pipe 70 and exhaust hose 72 when the temperature of cooling water reaches a setting value and an opening/closing valve 71a is opened.

The motor-driven pump 55 is disposed in the vicinity of and parallel to the thermostat 71 and provided with an electric motor (not shown) drive-controlled by a controller (not shown) using a battery 56, disposed below the seat 7, as a power source. A suction port 55a of the motor-driven pump 55 is connected to the upstream side of the opening/closing valve 71a of the thermostat 71. A delivery port 55b is connected to the suction port 53c of the water pump 53 through a circulation pipe 73.

To the cooling water filler port 54d of the radiator 54 is connected a filler hose 74 and to the filler hose 74 is connected a filler cap 75 provided in a gusset in front of the fuel tank 6. To the filler cap 75 is connected a recovery hose 76 and the recovery hose 76 is connected to the bottom of a recovery tank 77 provided under the battery 56.

To the recovery tank 77 is connected a recovery filler port 77a provided under the seat 7, through a filler hose 77b.

The partial water cooling system of this embodiment is operated as follows. When a main switch (not shown) is turned on and the engine 15 is started, the crankshaft 21 rotates, causing the mechanical pump 53 to rotate. When the temperature of the cooling water in the cooling jacket 52, in the thermostat 71, to be exact, exceeds a given value, the thermostat 71 is opened and the cooling water is circulated between the cooling jacket 52 and radiator 54.

When the main switch is turned off, the engine 15 stops, causing the mechanical pump 53 to stop. Then, the motor-driven pump 55 is started by the battery 56, the cooling water in the cooling jacket 52 is circulated through the discharge pipe 69, joined flow pipe 70, circulation pipe 73 and supply pipe 66. The radiator 54 is by passed and the motor is stopped after a lapse of a given time (see FIG. 8 and FIG. 13).

In the cooling structure of this embodiment, the annular cooling jacket 52 is formed in the shape of a passage passing through the front and rear cylinder heads 19, 20 between the intake ports 19d, 20d as well as exhaust ports 19e, 20e, and the lower mating surfaces 19f, 20f, and surrounding the peripheral portions of the combustion recesses 19a, 20a, for the circulation of cooling water between the cooling jacket 52 and radiator 54. Therefore, the region around the combustion recesses 19a, 20a subjected to a particularly high heat load can be partially cooled with the cooling water, thereby securing engine cooling performance necessary to an air-cooled engine of a large displacement, whose bore diameter exceeds 100 mm.

The cooling jacket 52 is formed only in the peripheral portions of the combustion recesses 19a, 20a, so that cooling water capacity can be decreased to a value as small as 60 cc, and the size reduction and the weight saving of the radiator 54 and mechanical pump 53 can be effected that much. As a result, the size increase as well as the weight increase of the engine due to the additional partial water cooling system can be suppressed and the degree of freedom in designing of the engine and body can be secured.

In this embodiment, a structure is adopted in which the partial water cooling system is provided with the mechanical pump 53 driven for rotation by the engine 15 and the motor-driven pump 55 for circulating cooling water in the cooling jacket for a given time when stoppage of the engine causes the mechanical pump 53 to stop. Therefore, the cooling performance required in a high speed and high load operating range can be secured with a small amount of cooling water while preventing boiling of the cooling water at the time the engine stops.

It may be possible that circulation of the cooling water while the engine operates and the engine stops is performed entirely by the motor-driven pump 55. In this case, however, it is necessary for the motor-driven pump to provide a required amount of cooling water circulation in a high speed and high load operating range of the engine, resulting in a large and heavy electric motor.

The function required by the motor-driven pump 55 in this embodiment is satisfied if only cooling water in the cooling jacket 52 is circulated for a certain time when the engine stops, so that a small pump of a small capacity can be of use. In addition, since in this embodiment, the motor-driven pump 55 is utilized as an auxiliary and arranged such that it bypasses the radiator 54, it doesn't act as a water flow resistance in the main path. Further, no large flow rate is required for the passage related to the motor-driven pump, so that the diameter of the passage can be decreased and the cooling water rarely flows to the motor-driven pump as a bypass during the normal operation of the engine.

The electric motor 35 can be placed, directly or through a bypass, in the middle of the main path passing through the radiator 54.

Further, in this embodiment, the radiator 54 is disposed in front of the left and right down tubes 2a of the body frame 2 such that the upper header 54a of the radiator 54 is positioned at a height corresponding to the lower end of the cylinder block 18. Therefore, the blocking of the wind to the engine 15 by the radiator 54 can be prevented, securing air-cooling performance.

Figure 21:
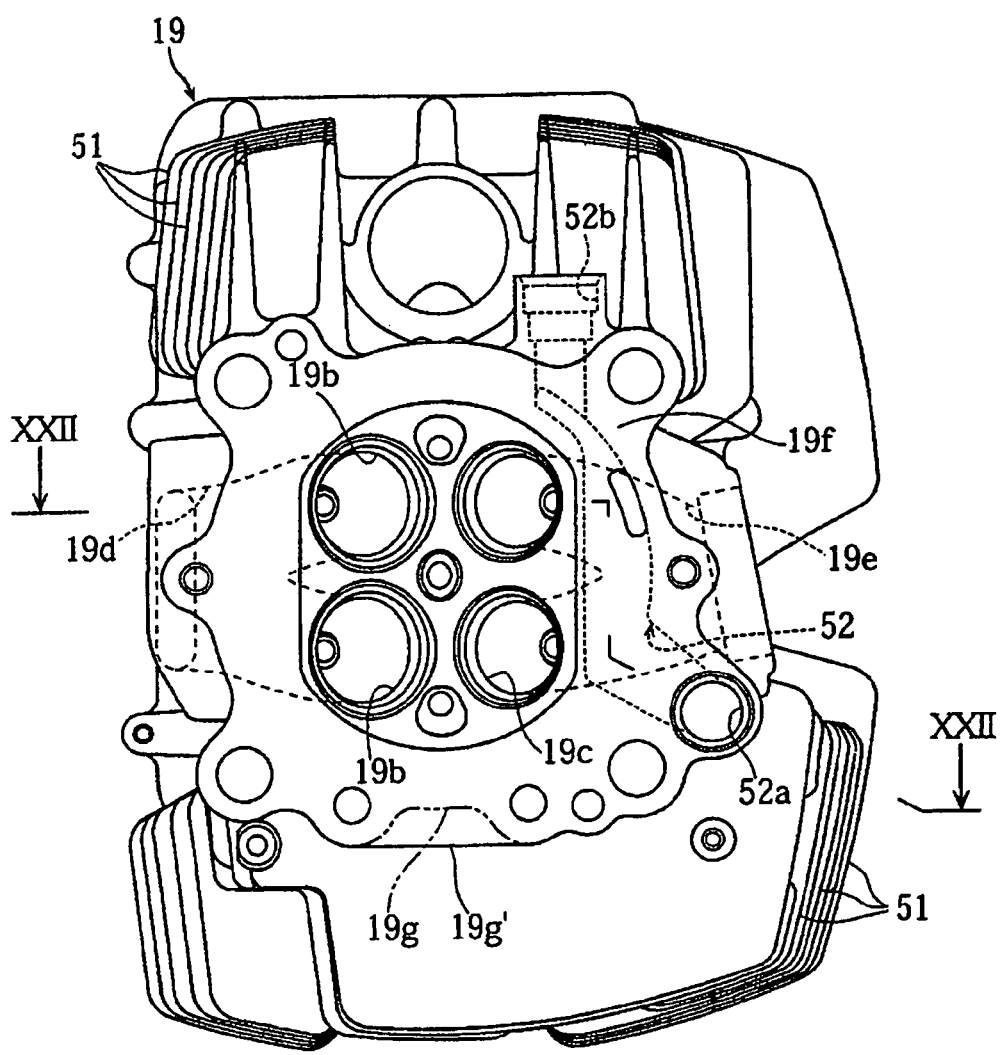
FIG. 21 is a bottom view of a cylinder head according to another embodiment of this invention.
Figure 22:
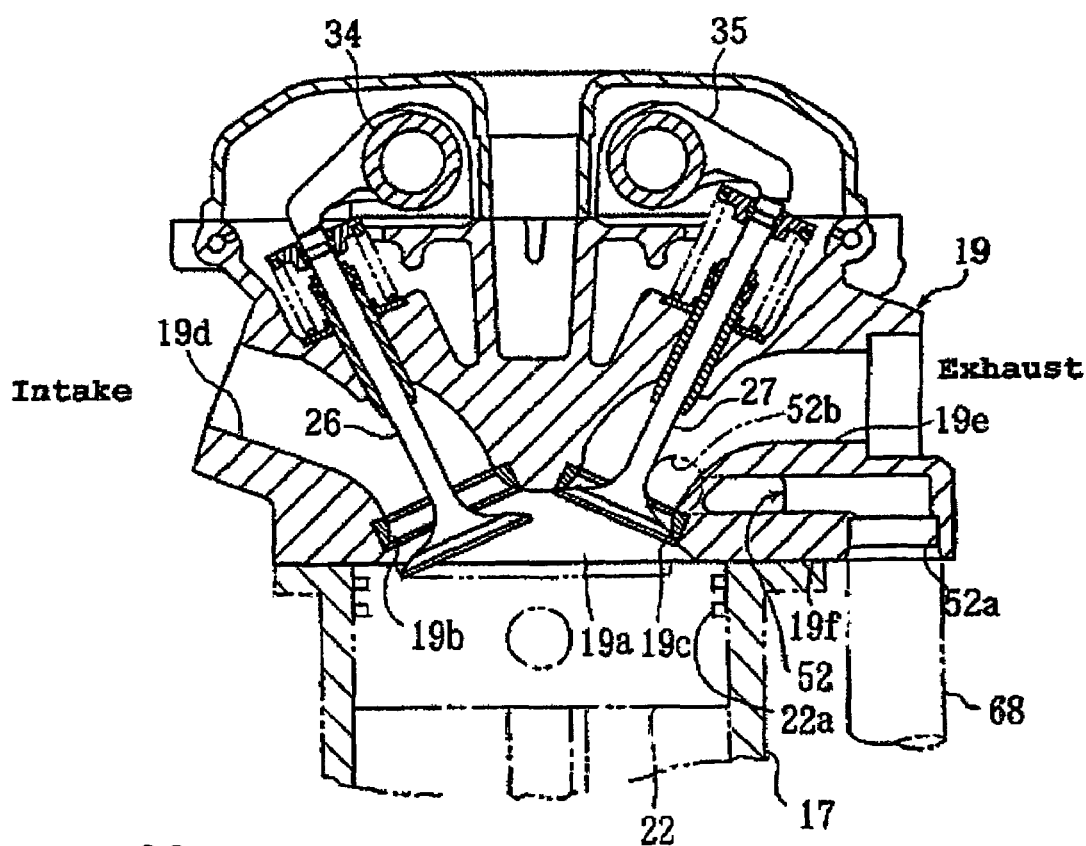
FIG. 22 is a sectional view taken along the line XXII—XXII of FIG. 21.

In the cooling structure of the foregoing embodiment, a case, where a cooling jacket 52 is formed passing under the intake and exhaust ports and surrounding the peripheral portion of the combustion recess, has been described, as an example. However, this invention is not limited to that. As shown in FIG. 21 and FIG. 22, the cooling jacket 52 may be formed in the cylinder head 19 between the exhaust port 19e and the lower mating surface 19f and only in a region corresponding to the exhaust valve opening 19c. In these figures, reference numerals, which are the same as in FIG. 11 and FIG. 12, designate the same or equivalent parts.

In this case, only a region around the exhaust port 19e subjected to the highest heat load is cooled, so that the capacity of the cooling jacket 52 can be further decreased to about 35 cc, thereby suppressing the size increase of the engine and securing the degree of freedom in designing.

Further, as shown in FIG. 21, a thick portion 19g' may be formed to fill the recessed portion in the right wall 19g of the cylinder head 19. This allows heat in the intake side to be transmitted easily to the cooling jacket 52 through the thick portion 19g', effecting a higher cooling efficiency.

Figure 23:
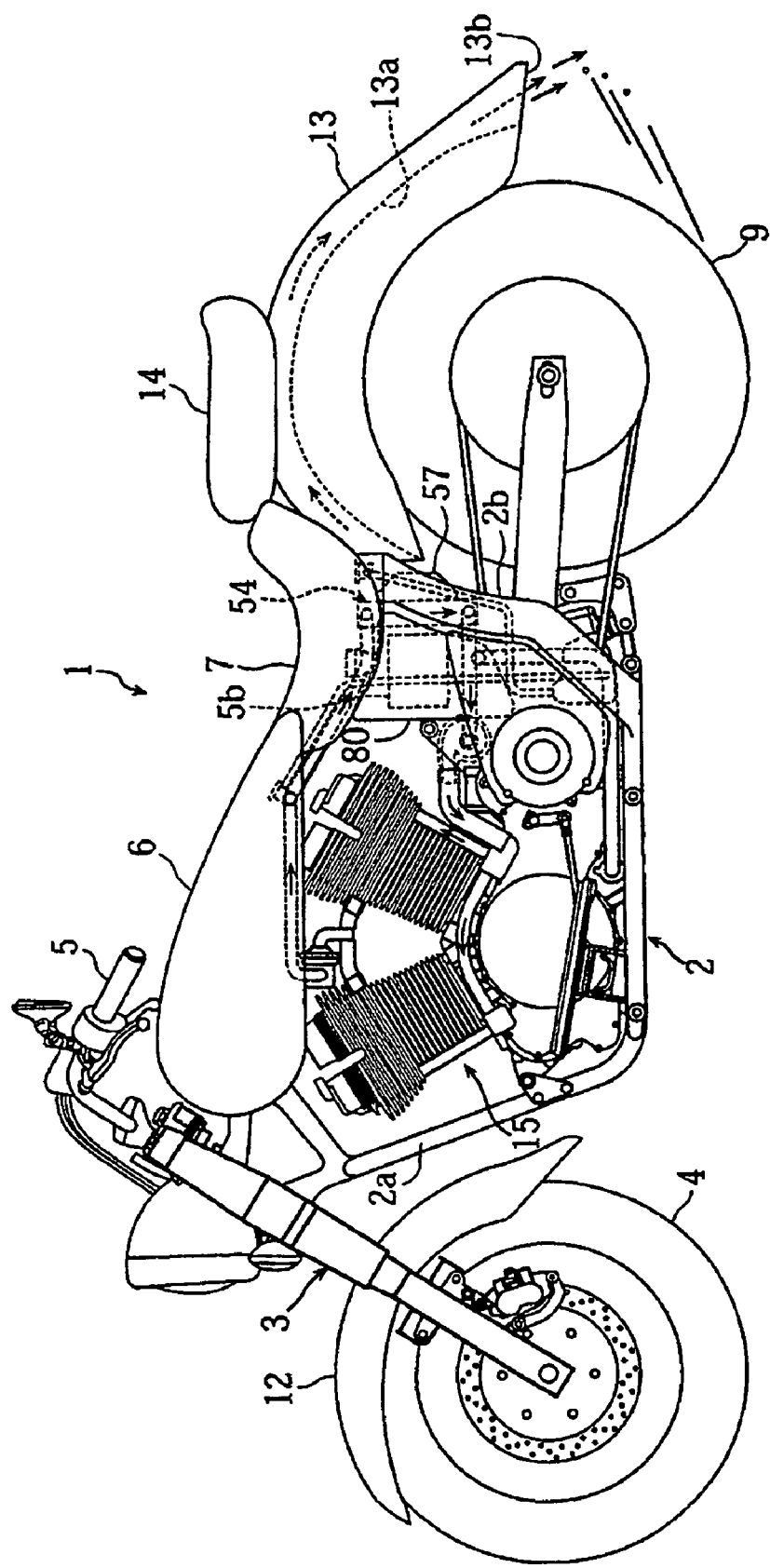

In the foregoing embodiment, a case, where a radiator 54 is disposed at the lower forward end of the body frame 2, has been described. However, this invention is not limited to that. As shown in FIG. 23, the radiator 54 may be disposed under the seat 7. An oil tank 80 and a battery 56 may be disposed parallel to each other in front of the radiator at the left and right sides. The rear wheel 9 and rear fender 13 may be disposed behind the radiator. Further, left and right rear arm brackets 2b of the body frame 2 at the left and right sides of the radiator 54 may also be provided. In the figure, reference numerals, which are the same as in FIG. 1, designate the same or equivalent parts.

As described above, the radiator 54 is disposed under the seat 7, with the front of the radiator 54 surrounded by the oil tank 80 and battery 56, the rear of the radiator surrounded by the rear wheel 9 and rear fender 13, and the left and right sides surrounded by the rear arm brackets 2b. Therefore, the radiator 54 can be disposed in an inconspicuous location. In other words, the radiator can be disposed in a location where its presence is not recognized easily, improving the external appearance of the air-cooled engine.

Furthermore, a duct 13a may be formed along the inside surface of the rear fender 13, with an upstream port 13c opened facing the fan 57 of the radiator 54 and a downstream port 13b opened facing the ground so that the cooling wind from the cooling fan 57 of the radiator 54 is discharged to the ground through the duct 13a. In this case, water splashing caused by the rear wheel 9 can be suppressed by the cooling wind discharged from the duct 13a, preventing muddy water from sticking to the inner side of the rear fencer 13.

Regarding the crankshaft 21, the left and right crank journals 21c are supported by bosses 16c formed in the left and right walls of the crankcase section 16a. On the crankshaft 21 is mounted, at the left end, a generator 83 through a starter gear 82, and at the right end is fixed a crank gear 85 by key fitting.

The transmission mechanism is disposed in the mission case section 16b of the crankcase 16, which includes a main shaft 87 having an input gear group 89, a drive shaft 88 having an output gear group 90 meshing the input gear group 89, and a shift drum 93 for guiding and supporting an input side shift fork 91 engaged with the input gear group 89 and two output side shift forks 92 engaged with the output gear group 90, each disposed parallel to the crankshaft 21. The input side shift fork 91 and output side shift forks 92 are supported by fork shafts 91a, 92a, 92b for movement in the axial direction.

A foot-operated shift lever 94 (see FIG. 8) is operated in a swinging manner, causing the shift drum 93 to rotate and the shift forks 91, 92 to move axially to connect any specified gears of the input and output gear groups 89, 90 to the main shaft 87 and drive shaft 88, so that switching is performed between the lowest and the highest speed.

The left end portion of the drive shaft 88 protrudes outward from the mission case section 16b and an unillustrated drive sprocket mounted on the protruding drive shaft 88 is connected to a follower sprocket 93a of the rear wheel 9 through a drive belt 93 (see FIG. 1).

A clutch mechanism 95 is provided at the right end of the main shaft 87. The clutch mechanism 95 includes an outer drum 96 mounted on the main shaft 87 for relative rotation, an inner drum 97 coupled to the main shaft 87 for rotation therewith, and numerous clutch plates 98 disposed between the outer and inner drums 96, 97. In the clutch mechanism 95, a push rod 99 inserted in the center of the main shaft 87 is advanced and retracted by a hydraulic piston 100a of a hydraulic cylinder member 100, to transmit or cut off engine power to the main shaft 97.

Now, the balancer structure of the engine 15 will be described with reference mainly to FIG. 3, FIG. 4, FIG. 6 and FIG. 7.

A first balancer shaft 105 is provided, parallel to the crankshaft 21, on one side (forward side) of a normal plane B including the axis of the crankshaft 21 and on one side (upper side) of a horizontal plane A including its axis. Also, a second balance shaft 106 is disposed, parallel to the crankshaft 21, on the other side (rear side) of the normal plane B and on the other side (under side) of the horizontal plane A. The first and second balancer shafts 105, 106 are formed with weights 105a, 106a integrally and the balancer shafts 105, 106 are supported by the bosses 16c formed on the left and right walls of the crankcase section 16a through bearings 107, 108.

A first balancer gear 109 is fixed to the first balancer shaft 105 at the right end, and a second balancer gear 110 is fixed to the second balancer shaft 106 at the right end, each by key fitting. The first and second balancer gears 109, 110 mesh the crank gear 5 and the first and second balancer shafts 105, 106 are rotated at the same speed as the crankshaft 21 in the direction opposite to the rotation of the crankshaft 21.

The right end portion of the second balancer shaft 106 is formed with an extension 106b and a boss 110a formed on the second balancer gear 110 as its extension is fitted on the extension 106b. On the boss 110a and outside the second balancer gear 110 is mounted a counter gear 111 of the same diameter as the second balancer gear for relative movement, and the counter gear 111 is meshed with a large reduction gear 112 mounted on the main shaft 87 for relative rotation.

This is the structure of the rotational force transmission path for transmitting the rotational force of the crankshaft 21 to the main shaft 87 through the second balancer shaft 106. Reference numeral 111*a* designates a scissors gear for absorbing the backlash between the counter gear 111 and the large reduction gear 112. As such, the extension 106*b* and thus the second balancer shaft 106 are also used as a counter shaft. The large reduction gear 112 is coupled to the outer drum 96 through a rubber damper 113.

A disc spring type torque damper 115 is provided outside the counter gear 111 of the second balancer gear 110. The torque damper 115, as shown in FIG. 7, is disposed in the rotational force transmission path on the downstream side from the second balancer gear 110 of the second balancer shaft 106.

The torque damper 115 is constituted such that outside a lifter 116 formed with a projection 116*a* to be engaged with a recess 111*a* of the counter gear 111 is provided a pair of leaf springs 117 for pushing the lifter 116 and biasing it towards the counter gear 111, and outside the leaf springs 117 is disposed a spring receiving member 118.

The lifter 116 and spring receiving member 118 are spline-fitted on the boss 110*a* of the second balancer gear 110 for rotation with the second balancer gear 110 and for axial movement. The spring receiving member 118 is restricted for its outward movement in the axial direction by a cotter fitted in the boss 110*a*. When torque variations occur in the crankshaft 21 and excessive torque is transmitted to the counter gear 111, the lifter 116 moves axially outwardly against the biasing force of the leaf springs 117, causing a sliding movement of the counter gear 111 on the boss 110*a*, resulting in damping of the torque variations.

In this case, since the torque damper 115 is disposed in a rotational force transmission path of the crankshaft 21 on the downstream side from the balancer gear 110 of the second balancer shaft 106, the foregoing sliding movement doesn't change the phase angle of the balancer shaft 106 and the function as a balancer is not hindered.

Now, the positional relation between the crankshaft 21, the first and second balancer shafts 105, 106, the main shaft 87, the drive shaft 88 and the shift drum 93 of the engine 15 will be described with reference mainly to FIG. 3.

The first and second balancer shafts 105, 106 are disposed in front of and above, and behind and below the crankshaft 21, respectively.

The main shaft 87 is disposed further rearward and further upward than the second balancer shaft 106, and the drive shaft 88 is disposed downward and rearward of the main shaft 87 and approximately on the horizontal plane A. The shift drum 93 is disposed such that its axis is positioned in a region surrounded by axes of the second balancer shaft 106, main shaft 87 and drive shaft 88. The shift drum 93 is disposed in front of the main shaft 87 and below the horizontal plane A.

In the balancer structure of this embodiment as described above, a first balancer shaft 105 is disposed in front of a normal plane B passing through the axis of the crankshaft 21, and a second balancer shaft 106 is disposed behind the normal plane. On the extension 106*b* of the second balancer shaft 106 is provided a counter gear 111 for transmitting the rotation of the crankshaft 21 to the main shaft 87. Therefore, the second balancer shaft 106 can be used as a counter shaft, and the longitudinal length of the crankcase 16 can be decreased by eliminating the amount corresponding to the space occupied by the counter shaft.

In this embodiment, a counter gear 111 and a disc spring type torque damper 115 are provided on the downstream side of the rotational force transmission path from the second balancer gear 110 fixed to the second balancer shaft 106. Therefore, the phase shift of the second balancer shaft 106 can be prevented at the time of the activation of the torque damper 115.

Further, the main shaft 87 is disposed on the opposite side from the crankshaft 21 with the second balancer shaft 106 placed therebetween. Therefore, a relatively large space is formed in the meshing portion of the counter gear 110 on the balancer shaft 106 with the large reduction gear 112 on the main shaft 87, and the shift drum 93 can be disposed without interference by utilizing this space.

The main shaft 87 is disposed behind and above the second balancer shaft 106, and the shift drum 93 between the main shaft 87 and second balancer shaft 106, that is, in front of the main shaft 87. Therefore, the drive shaft 88 can be disposed closer to the crankshaft 21 compared with the prior art in which the shift drum is disposed behind the main shaft, and the longitudinal length of the crankcase 16 can be decreased.

In this embodiment, the first balancer shaft 105 is disposed above the horizontal plane A passing through the center of the crankshaft 21, and the second balancer shaft 106 below the horizontal plane. Therefore, the horizontal distance between the first and second balancer shafts 105, 106 on both sides of the crankshaft 21 can be decreased and thus the longitudinal length of the crankcase 12 can be decreased as well.

Now, a lubrication device of the engine 15 will be described with reference mainly to FIG. 14–FIG. 20.

The lubrication device of this embodiment is provided, as shown in FIG. 20, with a transmission lubrication system 126 for supplying lubricant in the oil tank 80 to the transmission by an oil feed pump 124*c*, and an engine lubrication system 127 for supplying oil to the engine, and the engine lubrication system 127 is branched into a cam lubrication system 127*a* and a cylinder lubrication system 127*b*. In these lubrication systems, lubricant falls into the oil sump 16*e* at the bottom of the crankcase 16 and is drawn up from the reservoir by oil scavenging pumps 124*a*, 124*b* to be returned to the oil tank 80.

In the transmission lubrication system 126, lubricant is supplied from the main shaft to the input gear group and the clutch mechanism, to the drive shaft and the shift fork through a mission shower, and thereafter to the output gear group.

In the cam lubrication system 127*a*, lubricant is supplied from a right crank journal to left front and rear cam journals, a front connecting rod large end and a hydraulic tensioner in a branched manner. The lubricant supplied to the left front cam journal is supplied from a front hydraulic lifter and a right front cam journal to a front rocker arm through a front push rod. The lubricant supplied to the left rear cam journal is supplied from a rear hydraulic lifter and a right rear cam journal to a rear rocker arm through a rear push rod. The lubricant supplied to the front connecting rod is supplied to a front piston.

In the cylinder lubrication system 127*b*, lubricant is supplied from a left crank journal to the front and rear cylinder heads, an ACM coil, a rear connecting rod large end and a starter one way in a branched manner. The lubricant supplied to the front and rear cylinder heads is supplied separately to front and rear valve stem ends and the lubricant supplied to the rear connecting rod is supplied to a rear piston. The lubricant falls to the bottom of the crankcase through unillustrated passages after lubricating moving parts.

An oil filter 130 is mounted detachably to the lower end of a rear wall 16*d* of the crankcase 16. The oil filter 130 is constituted such that an oil element 131 is provided in a filter chamber 130a and the filter chamber 130a is divided into an oil inflow chamber 130b and an oil outflow chamber 130c by the oil element 131. The oil inflow chamber 130b is in communication with an inflow passage 16f formed on the rear wall 16d and the oil inflow chamber 130c is in communication with an outflow passage 16g formed on the rear wall 16d.

To the outflow passage 16g of the rear wall 16d is connected a main gallery 128. The main gallery 128 is in communication with left and right crank journals 21c. In the crankcase 16 is formed a mission passage 129 in communication with the upstream end of the main gallery 128, and the mission passage 129 is in communication with a boss 87a supporting the right end of the main shaft 87.

The oil scavenging pumps 124a, 124b and an oil pump 125 acting as the oil feed pump 124c are disposed under the shift drum 93 in the crankcase 16. The oil pump 125 has a housing 125a fixed to the inner side of a right wall 16h of the crankcase 16, and a pump shaft 125b inserted for rotation in the housing 125a and disposed parallel to the crankshaft 21. A pump gear 133 is mounted to the left end portion of the pump shaft 125b protruding from the housing 125a. The pump gear 133, as shown in FIG. 6, meshes a drive gear 134 mounted on the left end of the second balancer shaft 106 through a middle gear 135 so that rotation of the crankshaft 21 causes the pump shaft 125b to rotate.

As shown in FIG. 16, first and second pump chambers 136a, 136b acting as the oil scavenging pumps 124a, 124b and a third pump chamber 136c acting as the oil feed pump 124c are formed, separate from each other, around the pump shaft 125b in the housing 125a. First, second and third rotors 137a, 137b, 137c mounted on the pump shaft 125b are provided in the pump chambers 136a–136c, respectively.

A suction passage 138a is formed on the upstream side of the third pump chamber 136c in the housing 125a, and a delivery passage 138b is formed on the downstream side. To the suction passage 0.138a is connected a downstream end of an oil feed pipe 132 connected to the oil tank 80. Also, the oil inflow chamber 130b of the oil filter 130 is connected to the delivery passage 138b, with a check valve 139 for preventing back flow of the lubricant placed therebetween.

First and second collection passages 140a, 140b are formed independently on the upstream side of the first and second pump chambers 136a, 136b in the housing 125a, respectively, and a joined flow passage 140c is formed on the downstream side. An oil return pipe 141 is connected to the joined flow passage 140c, and the downstream end of the oil return pipe 141 is connected to the oil tank 80.

An approximately flat oil sump 16e is formed at the bottom of the crankcase 16. Inside the crankcase 16 is formed an arcuate partition wall 16i surrounding the lower part of the rotation locus of the crank arm 21b, and at the forward end of the partition wall 16i is formed a cutout 16j extending over the entire width. The partition wall 16i serves as a means of preventing lubricant from being stirred up in the oil sump 16e. The cutout 16j is an opening through which lubricant splashed by the crankshaft 21 is returned to the oil sump 16e.

Here, the partition wall 16i is formed in an arcuate shape and the portion of the partition wall under the crankshaft is brought close to the bottom of the crankcase 16. Therefore, the oil sump 16e in this embodiment can be considered as being divided substantially into a front portion 16e' and a rear portion 16e" on both sides of the normal plane B including the axis of the crankshaft 21.

Front and rear suction ports 142, 143 are provided in the front portion 16e' and rear portion 16e" of the oil sump 16e on both sides of the crankshaft 21, respectively. Here, the front portion 16e' and the rear portion 16e" of the oil sump 16e are portions where lubricant is likely to be swept in and accumulated due to pressure variations associated with the rotation of the crankshaft 21 and reciprocating movement of the piston, and the front and rear suction ports 142, 143 are disposed in such portions.

The rear suction port 143 is connected to the first collection passage 140a of the oil pump 125 integral therewith, which opens downward close to the bottom of the crankcase. A plate-like rear strainer 143 is provided in the rear suction port 143.

The front suction port 142 is formed under the partition wall 16i of the right wall 16h of the crankcase 16. A cylindrical front strainer 144 is inserted in the front suction port 142, and a drawing pipe 145 is connected to the strainer 144. The drawing pipe 145 is provided extending longitudinally outside the right wall 16h, and the downstream end of the drawing pipe 145 is connected to the second collection passage 140b of the oil pump 125. The drawing pipe 145, as shown in FIG. 17, is disposed below the crank arm 21b of the crankshaft 21 in a region offset from the crank arm 21b in the axial direction of the crankshaft.

Now, the effects and the functions of this embodiments will be described.

In the lubrication device of this embodiment, suction ports 142, 143 are disposed in the front portion 16e' and the rear portion 16e" of the oil sump 16e on both sides of the crankshaft 21. Therefore, lubricant can be collected reliably without accumulation even if it is dispersed forward and rearward of the oil sump 16e. As a result, the bottom of the crankcase 16 can be elevated, the engine height can be suppressed that much, and the problem of accumulation of lubricant can be resolved when the engine displacement is increased, for example, to 1000 cc or larger.

In this embodiment, the suction ports 142, 143 are disposed in the front portion 16e' and the rear portion 16e" of the oil sump 16e, which means that they are disposed in locations where lubricant is most likely to be accumulated. Therefore, collection efficiency of the lubricant is enhanced.

In this embodiment, on the pump shaft 125b of the oil pump 125 are mounted first and second rotors 137a, 137b for sucking lubricant from the suction ports 142, 143, and a third rotor 137c for delivering lubricant in the oil tank 80. Therefore, if one oil pump 125 is only disposed in the crankcase 16, the pump is allowed to act as two scavenging pumps 124a, 124b and one oil feed pump 124c, preventing the size of the lubrication system to increase.

Figure 24:
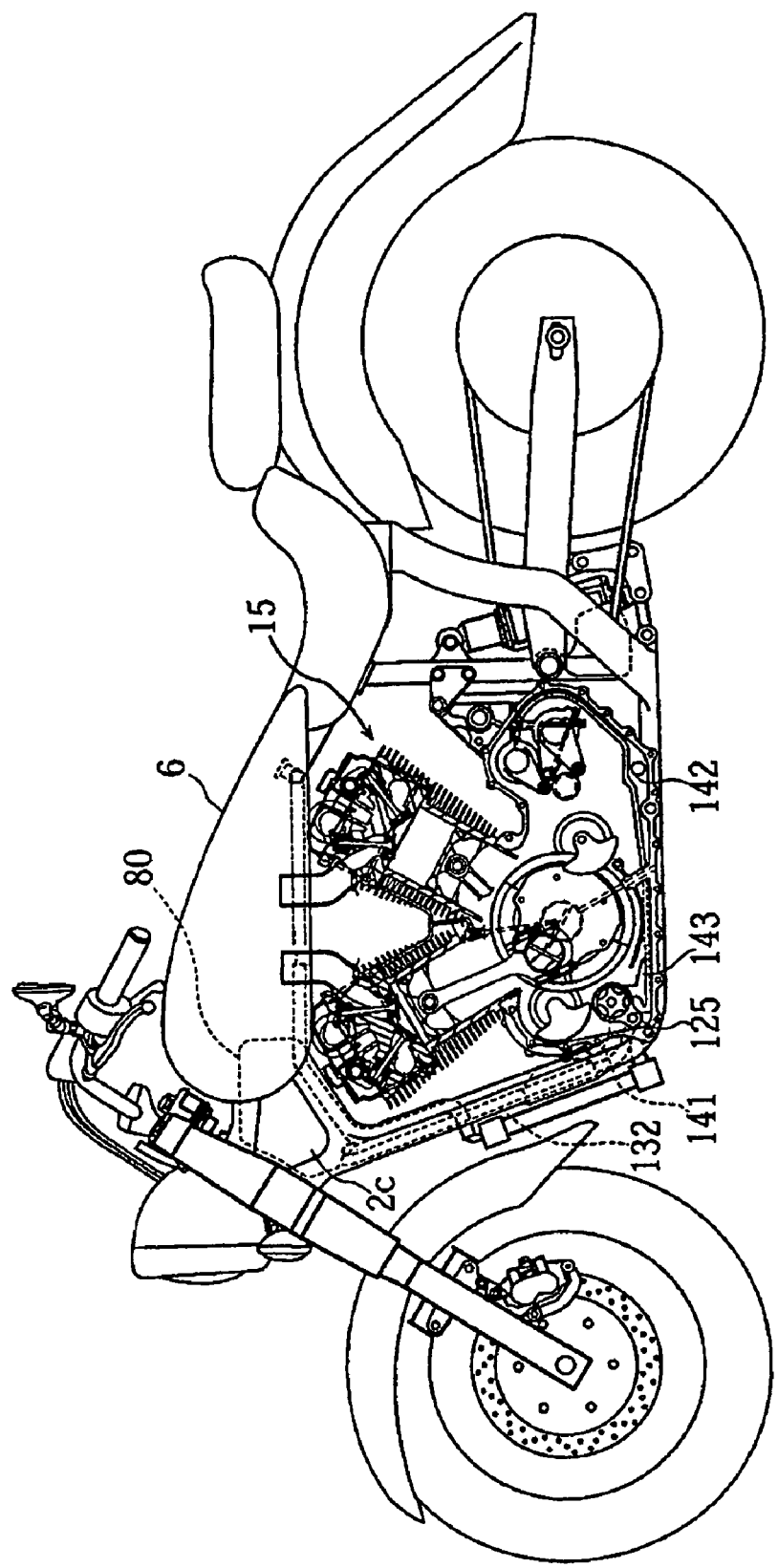
FIG. 24 is a view showing an arrangement of an oil tank according to still another embodiment of the present invention.

In the foregoing embodiment, a case, where an oil tank 80 is disposed under the seat, has been described. However, this invention is not limited to that. As shown in FIG. 24, the oil tank 80 may be disposed in a space behind the head pipe (not shown) and surrounded by the gusset 2c and the fuel tank 9. In this case, the oil pump 125 may be disposed at the forward end of the bottom of the crankcase.

In this case, the oil tank 80 is disposed by utilizing a vacant space at the front of the body frame 2, and the piping distance between the oil tank 80 and oil pump 125 can be decreased compared with when the oil tank is disposed under the seat, simplifying the lubrication path.

What is claimed is:

1. A balancer structure for an engine, comprising:
   a first balancer shaft;
   a second balancer shaft;
   a crankshaft having a crank gear; and balancer gears on the first and second balancer shafts provided parallel to the crankshaft and driven for rotation by the crank gear, wherein the first balancer shaft is provided on one side of a normal plane including an axis of the crankshaft, and the second balancer shaft is provided on another side, and on the second balancer shaft is provided a counter gear for transmitting a rotation of the crankshaft to a main shaft of a transmission mechanism.

2. The balancer structure for an engine according to claim 1, wherein a torque damper for preventing a large torque from the crankshaft from being transmitted directly to the main shaft is provided in a drive force transmission path for transmitting a drive force of the crankshaft to the main shaft, on a downstream side from the balancer gears on the second balancer shaft.

3. The balancer structure for an engine according to claim 1, wherein the main shaft is provided on an opposite the side from the crankshaft, with the first and second balancer shafts placed therebetween, and a shift drum is provided between the main shaft and the second balancer shaft.

4. The balancer structure for an engine according to claim 1, wherein the first balancer shaft is disposed on one side of a horizontal plane including the axis of the crankshaft, and the second balancer shaft is disposed on the another side.

5. The balancer structure for an engine according to claim 1, wherein the engine has front and rear cylinders disposed forming a V-bank and is a V-type, two-cylinder engine mounted on a vehicle body.

6. The balancer structure for an engine, according to claim 1, wherein the crankshaft is oriented in a lateral direction relative to the first and second balancer shafts.

7. The balancer structure for an engine, according to claim 4, wherein the first balancer is disposed in front of a normal plane including the axis of the crankshaft and above the horizontal plane including the axis of the crankshaft.

8. The balancer structure for an engine, according to claim 7, wherein the second balancer shaft is disposed behind the normal plane and below the horizontal plane.

9. The balancer structure for an engine according to claim 7, further comprising a drive shaft of the transmission mechanism disposed rearward of the second balancer shaft and near the horizontal plane.

10. The balancer structure for an engine, according to claim 9, wherein the main shaft is disposed above the horizontal plane and between the drive shaft and the second balancer shaft.

11. The balancer structure for an engine, according to claim 9, further comprising a shift drum disposed such that its axis is located in a region surrounded by axes of the main shaft, the drive shaft and the second balancer shaft.

12. A balancer structure for an engine, comprising:
a first balancer shaft;
a second balancer shaft;
a crankshaft having a crank gear; and means on the first and second balancer shafts provided parallel to the crankshaft and driven for being rotated by the crank gear, wherein the first balancer shaft is provided on one side of a normal plane including an axis of the crankshaft, and the second balancer shaft is provided on another side, and on the second balancer shaft is provided a counter gear for transmitting a rotation of the crankshaft to a main shaft of a transmission mechanism.

13. The balancer structure for an engine according to claim 12, wherein a torque damper for preventing a large torque from the crankshaft from being transmitted directly to the main shaft is provided in a drive force transmission path for transmitting a drive force of the crankshaft to the main shaft, on a downstream side from the means for being rotated on the second balancer shaft.

14. The balancer structure for an engine according to claim 12, wherein the main shaft is provided on an opposite side from the crankshaft, with the first and second balancer shafts placed therebetween, and a shift drum is provided between the main shaft and the second balancer shaft.

15. The balancer structure for an engine according to claim 12, wherein the first balancer shaft is disposed on one side of a horizontal plane including the axis of the crankshaft, and the second balancer shaft is disposed on the another side.

16. The balancer structure for an engine according to claim 12, wherein the engine has front and rear cylinders disposed forming a V-bank and is a V-type, two-cylinder engine mounted on a vehicle body.

17. The balancer structure for an engine, according to claim 12, wherein the crankshaft is oriented in a lateral direction relative to the first and second balancer shafts.

18. The balancer structure for an engine, according to claim 15, wherein the first balancer is disposed in front of a normal plane including the axis of the crankshaft and above the horizontal plane including the axis of the crankshaft.

19. The balancer structure for an engine, according to claim 18, wherein the second balancer shaft is disposed behind the normal plane and below the horizontal plane.

20. A method for balancing an engine, comprising:
driving balancer gears provided on first and second balancer shafts parallel to a crankshaft for rotation by a crank gear;
providing the first balancer shaft on side of a normal plane including an axis of the crankshaft;
providing the second balancer shaft on another side; and
providing a counter gear on the second balancer shaft for transmitting a rotation of the crankshaft to a main shaft of a transmission mechanism.

* * * * *